United States Patent [19]

Steiner

[11] Patent Number: 5,729,071
[45] Date of Patent: Mar. 17, 1998

[54] LOW COST MULTI-POLE MOTOR CONSTRUCTIONS AND METHODS OF MANUFACTURE

[76] Inventor: Robert E. Steiner, 1760 Horseshoe Ridge, Chesterfield, Mo. 63005

[21] Appl. No.: 568,966

[22] Filed: Dec. 7, 1995

Related U.S. Application Data

[63] Continuation-in-part of Ser. No. 381,187, Jan. 31, 1995, Pat. No. 5,619,086, and a continuation-in-part of Ser. No. 381,188, Jan. 31, 1995, Pat. No. 5,627,424.

[51] Int. Cl.⁶ .................................... H02K 1/12
[52] U.S. Cl. .................. 310/254; 310/172; 310/216; 310/184
[58] Field of Search .......................... 310/254, 172, 310/216, 258, 218, 171, 180, 184, 187, 193, 259; 29/603.23, 603.24, 606, 894.2

[56] References Cited

U.S. PATENT DOCUMENTS

| | | | |
|---|---|---|---|
| 2,123,182 | 7/1938 | Drake | 310/172 |
| 3,413,501 | 11/1968 | Dotto | 310/172 |
| 3,694,903 | 10/1972 | Deming | 29/596 |
| 3,986,062 | 10/1976 | Morrill | 310/172 |
| 4,017,776 | 4/1977 | Fiegel | 318/208 |
| 4,371,802 | 2/1983 | Morrill | 310/166 |
| 4,482,832 | 11/1984 | Minton | 310/216 |
| 4,554,471 | 11/1985 | Bertram et al. | 310/49 R |
| 4,600,864 | 7/1986 | Sato | 318/254 |
| 4,801,775 | 1/1989 | Cornell | 219/10.55 |
| 4,801,776 | 1/1989 | Cornell | 219/10.55 |
| 4,883,997 | 11/1989 | De Cesare | 310/179 |
| 4,883,999 | 11/1989 | Hendershot | 310/254 |
| 4,942,323 | 7/1990 | De Cesare | 310/208 |
| 5,130,591 | 7/1992 | Sato | 310/172 |

Primary Examiner—Thomas M. Dougherty
Assistant Examiner—Jonathan Link
Attorney, Agent, or Firm—Polster, Lieder, Woodruff, Lucchesi, L.L.C.

[57] ABSTRACT

Low cost multi-pole motor constructions and related methods of manufacture are disclosed. The economic advantages inherent in the construction and manufacture of C-frame motors, including modified and improved C-frame or twin bobbin motor constructions, have been applied to a variety of different kinds of motors including two pole, four pole and six pole permanent split capacitor motors; four pole, six pole, and eight pole shaded pole motors; stepper motors; multi-pole switched reluctance motors including two pole, four pole, six pole, and other multi-pole switched reluctance motors; as well as various other types of multi-pole motors. Such modified and improved C-frame motor constructions include the mounting of electrically conductive coils on at least one pair of adjacent and spaced side legs on one or both sides of a multi-pole central portion. Related methods for manufacturing laminations used in such motors from an elongated strip of material are also disclosed.

55 Claims, 17 Drawing Sheets

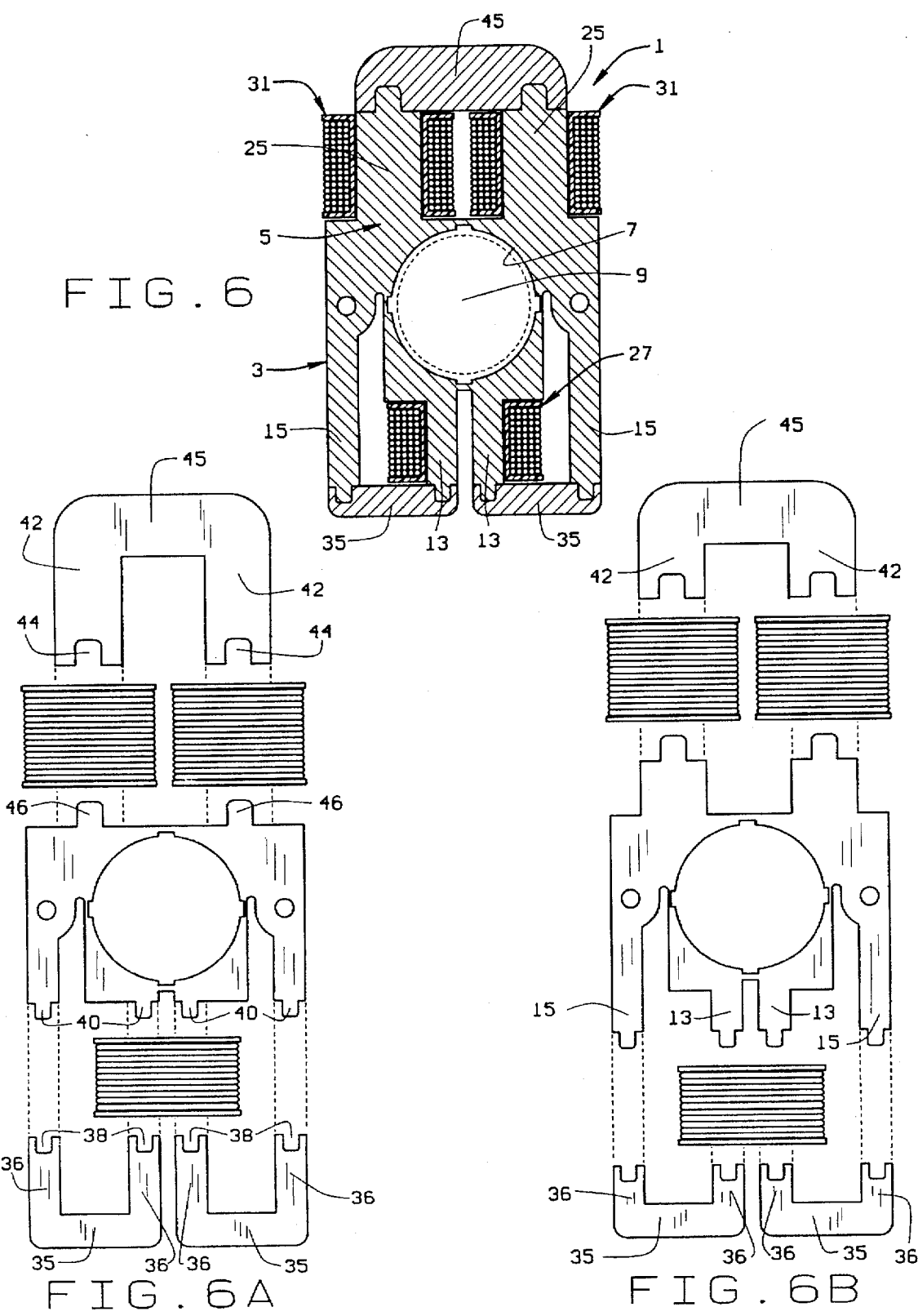

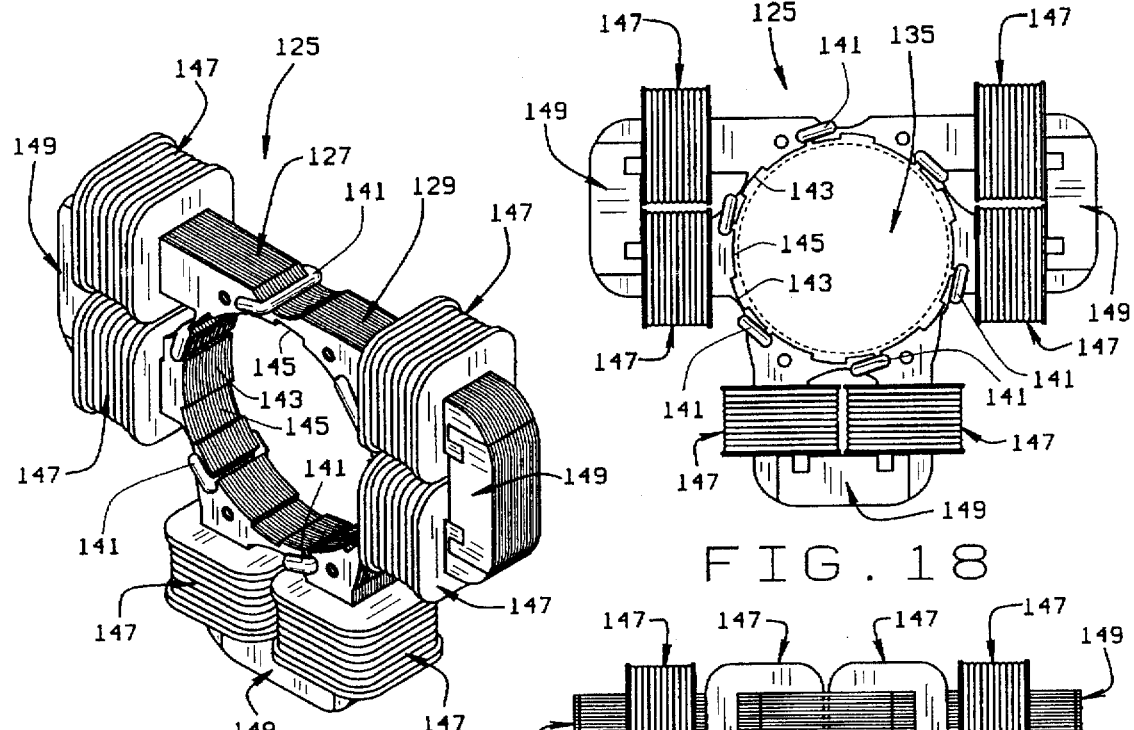
FIG. 17
FIG. 18
FIG. 19
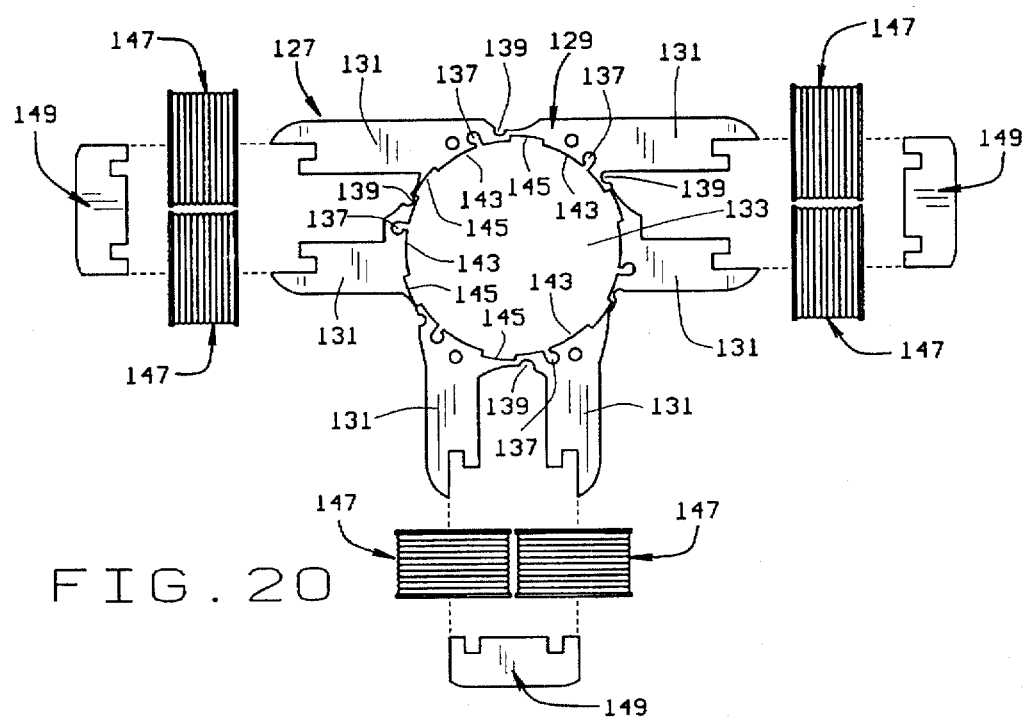
FIG. 20

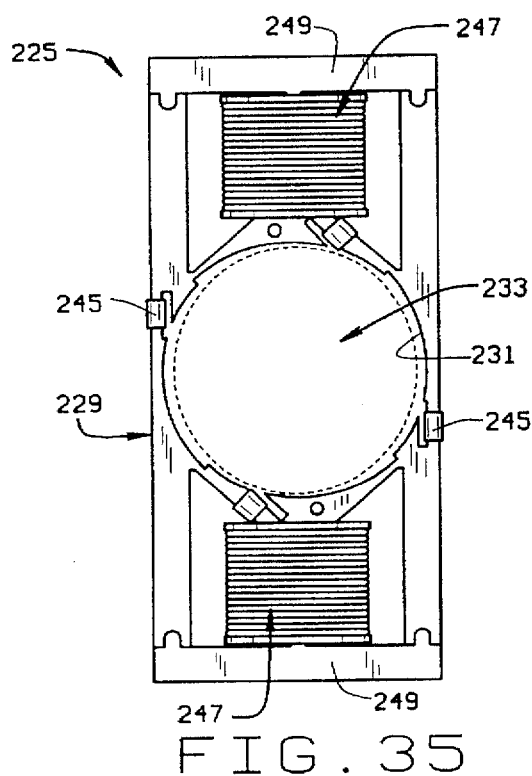
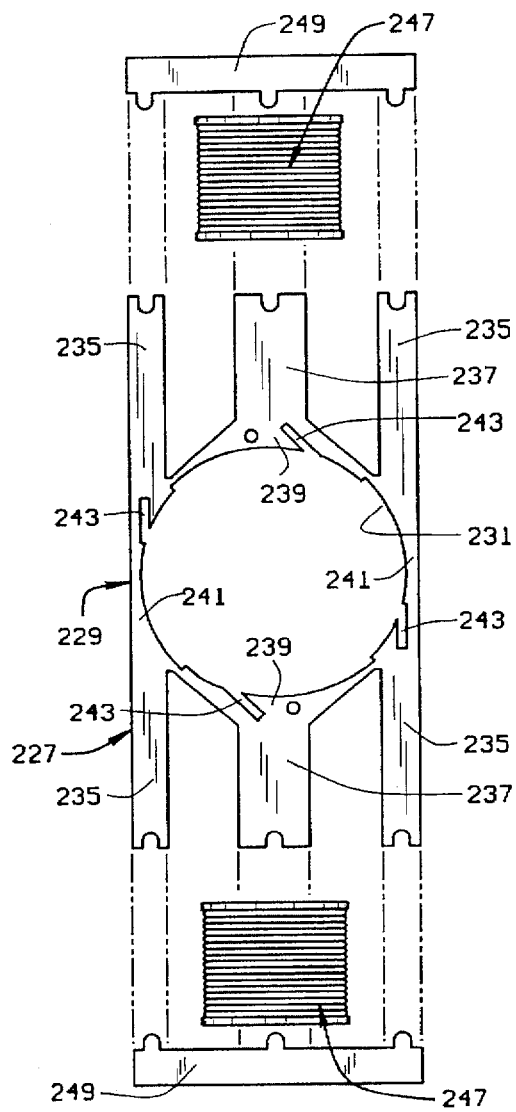
FIG. 35
FIG. 36
FIG. 37
FIG. 38

LOW COST MULTI-POLE MOTOR CONSTRUCTIONS AND METHODS OF MANUFACTURE

CROSS REFERENCE TO RELATED APPLICATIONS

This is a continuation-in-part of the following patent applications: U.S. Ser. No. 03/381,187 filed Jan. 31, 1995, entitled TWIN BOBBIN C-FRAME MOTORS AND METHODS FOR MAKING SAME, now U.S. Pat. No. 5,619,086 and U.S. Ser. No. 08/381,188 filed Jan. 31, 1995, entitled TWIN BOBBIN FOUR POLE MOTORS AND METHODS FOR MAKING SAME, now U.S. Pat. No. 5,627,424.

BACKGROUND OF THE INVENTION

The present invention relates to low cost multi-pole motor constructions and methods of manufacture, and more particularly, to new and improved constructions and techniques in the manufacture of a variety of different types and kinds of multi-pole motors including shaded pole, permanent split capacitor, stepper, switch reluctance and other types of motors.

It is well-known that the construction of and the techniques employed in the manufacture of C-frame motors make such motors among the most economical to produce. Unlike most motors having circular or other endless shape stators with inwardly extending poles that must be wound by expensive coil winding equipment in a time consuming process, C-frame motors enable a separately wound bobbin to be placed over an end leg which is then secured to spaced legs in a closed stator path that includes a rotor opening. The rotor opening receives a rotor that is driven by flux moving in the closed flux path of the C-frame stator. Up to the present invention; as described in my aforementioned copending patent applications and this application, these conventional C-frame motors have typically been limited to two pole motors.

Current four pole and other higher order multi-pole motors are currently made with circular or other endless shaped stator rings having inwardly directed poles that are wound with an electrically conductive coil. These include some two pole motors, but mostly four pole and six pole motors, including shaded pole motors, permanent split capacitor motors, stepper motors, switch reluctance motors and various other types of multi-pole motors, as well.

In conventional two pole C-frame motor constructions, a first stack of magnetically conductive laminations is provided with aligned circular-shaped rotor openings at one end and aligned U-shaped openings at a second end. A separate elongated stack of laminations is mounted to the first stack of laminations across the aligned U-shaped openings of the first stack of laminations after a single electrically conductive coil is positioned over the separate elongated second stack of laminations to provide a closed flux path. The second stack of laminations thus provides a coil winding area about which an electrically conductive coil can be positioned for introducing flux into a rotor that is received within the aligned rotor openings of the first stack of laminations, in order to provide a magnetic inductor circuit.

In my aforementioned patent application entitled TWIN BOBBIN C-FRAME MOTORS AND METHODS FOR MAKING SAME having Ser. No. 08/381,187 filed Jan. 31, 1995, now U.S. Pat. No. 5,619,086, it has been discovered that both of the spaced side legs of the first stack of laminations can be usefully employed for coil winding purposes. Specifically, if the coil winding areas of the spaced side legs in the first stack of laminations are positioned in proximity to the aligned rotor openings and rotor, several important advantages can be achieved. This construction permits electrically conductive coils to be mounted over the spaced side legs, thus providing a greater an&or more efficient flow of magnetic flux through the rotor of the magnetic inductor circuit. Also, the electrically conductive wire forming the electrically conductive coil that is positioned over each of the spaced side legs has less than one-half the length of a single electrically conductive coil in a conventional C-frame motor construction, and the diameter of the electrically conductive wire can be reduced, as well. The use of less than one-half of the length for the electrically conductive coil mounted on each pair of spaced side legs of the first stack of laminations is due to the greater winding length and smaller mean winding diameter for the two electrically conductive coils positioned on the spaced side legs, as compared to a single electrically conductive coil in a conventional C-frame motor construction. As a result, there is a shorter wire length for each of the electrically conductive coils that are positioned over one of the spaced side legs. Additionally, there is a reduction in the diameter of the electrically conductive wire for both electrically conductive coils. This wire diameter is believed due to the shorter wire length of each electrically conductive coil, the greater winding surface area of the two electrically conductive coils and the proximate location of the spaced electrically conductive coils on the spaced side legs of the first stack of laminations relative to the aligned rotor openings and rotor.

The aforementioned proximate location of the electrically conductive coils provides a more efficient flow of magnetic flux from the magnetic inductor circuit through the poles and into the rotor. In some instances, the overall dimension of the motor can be reduced to also reduce the length of the flux path, as well. In fact, performance tests have established that motors with this construction have a greater overall efficiency than conventional C-frame motors of the type described above.

Both the conventional C-frame motors and my improved twin bobbin C-frame motors described above are limited to two pole constructions; however, as disclosed in my copending patent application U.S. Ser. No. 08/381,188 filed Jan. 31, 1995 entitled TWIN BOBBIN FOUR POLE MOTORS AND METHODS FOR MAKING SAME, now U.S. Pat. No. 5,627,424, I have disclosed new and improved twin bobbin four pole motor constructions, as well.

In order to understand the advantages of my twin bobbin four pole motor construction, it is important to understand how current prior art four pole motors are constructed. Current four pole and other higher order multi-pole motors are typically manufactured in an annular or other endless shaped configuration with poles equidistantly spaced about the inner periphery of the annular or other endless shaped element. While such current four pole and other higher order multi-pole motors have chosen annular or other endless shaped constructions because they produce the shortest magnetic path in the most economical design that can be adapted to a variety of different end uses, there are nonetheless some inherent limitations in improving the cost and operating efficiency of such four pole and other higher order multi-pole motors.

As compared to such prior art motors, my aforementioned copending patent application Ser. No. 08/381,188 filed Jan. 31, 1995 entitled TWIN BOBBIN FOUR POLE MOTORS AND METHODS FOR MAKING SAME, now U.S. Pat.

No. 5,627,424, discloses a twin bobbin four pole motor having spaced pairs of legs extending from opposite sides of a four pole central portion which includes a rotor opening for receiving a rotor. At the free end of each of the spaced legs, an end leg is provided to extend across such spaced legs. Bobbins are mounted over each leg of the spaced pairs of legs on opposite sides of the central portion prior to the attachment of the end legs. Substantial savings are possible with such constructions as a result of the "footprint" of such designs, as well as the amount of material required for each electrically conductive coil wound about an insulating bobbin. For example, an electrically conductive coil that is positioned over each of the spaced side legs on opposite sides of the central portion can have less than one-half the length of a single electrically conductive coil in an equivalent magnetic inductor circuit, and the diameter of the electrically conductive wire can be reduced, as well, for the same reasons set forth above in connection with twin bobbin two pole C-frame motors.

In addition to the twin bobbin two pole C-frame motors of U.S. Ser. No. 08/381,187 filed Jan. 31, 1995 entitled TWIN BOBBIN C-FRAME MOTORS AND METHODS FOR MANUFACTURING SAME, now U.S. Pat. No. 5,617,086 and the twin bobbin four pole motors disclosed in U.S. Ser. No. 08/381,188 filed Jan. 31, 1995 entitled TWIN BOBBIN FOUR POLE MOTORS AND METHODS FOR MAKING SAME, now U.S. Pat. No. 5,627,424, it has been discovered that various other low cost multi-pole motors can be made incorporating some of the principles of my aforementioned designs, as well as including other new and improved features which thus expands the application of this technology to a wide range of motors. Such motors include four pole, six pole, and eight pole shaded pole motors, two pole, four pole, and six pole permanent split capacitor motors, stepper motors, multi-pole switch reluctance motors including two pole, four pole, six pole, and other multi-pole switch reluctance motors, as well as various other types of multi-pole motors. Thus, the advantages inherent in the construction and manufacturing of C-flame motors, as explained above, can also be applied to many other and different kinds of motors, as will become apparent from the detailed discussion that follows.

SUMMARY OF THE INVENTION

Among the several objects and advantages of the present invention include:

The provision of new and improved low cost multi-pole motors;

The provision of new and improved four pole, six pole, and eight pole motors, including shaded pole motors;

The provision of new and improved two pole, four pole, and six pole permanent split capacitor motors;

The provision of new and improved multi-pole stepper motors;

The provision of new and improved multi-pole switched reluctance motors including two pole, four pole, six pole, and other multi-pole switched reluctance motors;

The provision of new and improved multi-pole motors for a variety of different applications and end uses;

The provision of new and improved multi-pole motors which have a substantial reduction in the amount of material required;

The provision of the aforementioned multi-pole motors which enjoy substantial material savings in the amount of material required for electrically conductive coils and, in certain instances, also in the magnetically conductive means forming the magnetic inductor circuit;

The provision of the aforementioned multi-pole motors which, despite having substantial material savings in the construction of such motors, nonetheless provides better efficiency and overall performance for many prior art motors;

The provision of the aforementioned multi-pole motor constructions which are readily adaptable to present manufacturing techniques, do not require substantial modifications or changes and provide highly efficient, lower cost motors than prior art constructions;

The provision of new and improved methods for manufacturing such low cost multi-pole motors; and The provision of new and improved methods for forming such low cost, high efficiency multi-pole motors with new and improved method or procedural steps that provide reliable, continuous operation without substantial modifications or changes in known manufacturing techniques.

Briefly stated, the low cost multi-pole motors of the present invention include magnetically conductive stacked laminations each having a multi-pole central portion with a rotor opening and spaced and adjacent side legs extending outwardly from circumferentially spaced areas of the central portion and which terminate in an outer free extremity. The combined stacked laminations provide stacked and adjacent side legs in circumferentially spaced areas of stacked central portions with aligned rotor openings for receiving a rotor. Each of the stacked side legs have a combined predetermined outer cross sectional coil winding area. An electrically conductive coil is positioned about the coil winding area of at least one of the stacked side legs. Separate magnetically conductive stacked laminations are provided for attachment to the outer free extremities of the spaced and adjacent side legs.

In certain of the embodiments, the spaced and adjacent side legs extend from generally opposite areas of the central portion. An electrically conductive coil may be positioned about each of the thus formed spaced and adjacent side legs. At least one pair of the spaced and adjacent side legs may extend, in certain cases, from generally opposite areas of the central portion. In other cases, adjacent pairs of spaced and adjacent side legs may extend from generally opposite areas of the central portion. In still other cases, at least one additional pair of spaced and adjacent side legs may extend from the central portion generally intermediate the generally opposite areas of the central portion. In even still other instances, three spaced and opposed legs may extend from generally opposite areas of the central portion.

For a shaded pole motor, pole shading elements may be positioned in correspondingly shaped openings surrounding the rotor opening, as shown in the two pole and four pole twin bobbin constructions of my aforementioned copending patent applications.

For a two pole permanent split capacitor motor, an electrically conductive first coil may be positioned about spaced and adjacent side legs on one side of the central portion and an electrically conductive second coil may be positioned about each of the spaced and adjacent side legs on an opposite side of the central portion with the first coil being connected to the second coils and one of the first or second coils being connected to a capacitor to form the motor. In some instances, the first coil may be the main coil and the second coils may be the auxiliary coils. In other instances, the first coil may be the auxiliary coil and the second coils may be the main coils.

For a four pole permanent split capacitor motor, an electrically conductive main coil and an electrically conductive auxiliary coil may be positioned, in alternating fashion, about spaced and adjacent pairs of side legs constituting four spaced and adjacent legs on opposite sides of the central portion, with each main and auxiliary coil positioned on the spaced and adjacent side legs being connected to one another and at least one auxiliary coil on opposite sides of the central portion for connection to a capacitor to form the motor.

For a six pole shaded pole motor, an electrically conductive coil may be positioned about each of the spaced and adjacent side legs of the three spaced pairs of spaced and adjacent side legs circumferentially spaced around the central portion. In some instances, the six pole motor may be constructed as a switched reluctance motor.

For a six pole permanent split capacitor motor, electrically conductive main coils and electrically conductive auxiliary coils may be positioned in alternating fashion about four spaced and adjacent side legs which are arranged in three circumferentially spaced locations around the central portion.

For certain four pole motor constructions, an electrically conductive coil may be positioned about an intermediate leg of the three spaced and opposed legs on opposite sides of the four pole central portion with the intermediate leg on each side of the four pole central portion being proximate a north pole and the spaced legs on opposite sides of each intermediate leg being proximate a south pole.

For eight pole shaded pole motors, an electrically conductive coil may be positioned about each of the spaced and adjacent side legs of the adjacent pairs of spaced and adjacent side legs on opposite sides of the central portion and separate magnetic conductive stacked end laminations may be provided for attachment to the outer free extremities of each pair of adjacent pairs of spaced and adjacent side legs on opposite sides of the central portion.

For stepper motors, an electrically conductive coil may be positioned about each of the spaced and adjacent side legs of spaced and adjacent side legs on opposite sides of the eight pole central portion of magnetically conductive stacked laminations with separate magnetic conductive stacked end laminations for attachment to the outer free extremities of each pair of adjacent pairs of spaced and adjacent side legs on opposite sides of the central portion. The rotor opening provided in the eight central pole portion has a circumferential series of inwardly directed stator teeth surrounding the opening. Received within such rotor opening is a permanent magnet rotor with one-half of the teeth on opposite ends being offset by a one tooth width. By connecting two sets of four alternate coils in series with each other, out-of-time-phase current sources may be applied to step the rotor, rotating it in the rotor opening.

For multi-pole switched reluctance motors, magnetically conductive stacked laminations each having a multi-pole central portion with a rotor opening for receiving a rotor and one pair of spaced side legs may be provided. The rotor can include poles circumferentially offset from the poles of the multi-pole central portion at predetermined circumferentially spaced positions. An electrically conductive coil may be positioned about each of the spaced and adjacent side legs of the spaced pair of side legs and separate magnetically conductive stacked end laminations for attachment to an outer free end of the pair of spaced side legs may be provided to complete the motor. Such multi-pole motors may include two pole, four pole, six pole, and other multi-pole switched reluctance motor constructions.

For new and improved methods of constructing such low cost multi-pole motors, the methods include forming separate side and end laminations to form a combined lamination for use in a motor and include the steps of stamping from an elongated strip the side laminations each having a central portion with a rotor opening in at least one spaced pair of side legs extending from the central portion, forming adjacent side laminations with at least one spaced pair of side legs of each side lamination being in generally opposed mirror image relationship with one another and stamping at least one end lamination from each elongated strip for attachment to outer free extremities of the at least one spaced pair of side legs in the lamination with the end lamination being formed between the spaced pair of side legs of the mirror image side laminations.

For certain methods, each side lamination may be formed with at least one spaced pair of side legs on opposite sides of the central portion. Thus, each side of the side laminations may include one spaced pair of side legs with an end lamination for each spaced pair of side legs which is stamped from the material between each spaced pair of side legs.

Each side lamination may also include two spaced pair of side legs on opposite sides of the central portion and an end lamination, for attachment to the outer free extremities of the two pair of side legs on each side of the central portion, may be stamped from the elongated strip between opposed and spaced side legs of adjacent mirror image laminations. Each side lamination may further include two spaced pair of side legs on opposite sides of the central portion and an end lamination, for attachment to an outer free extremity of each pair of two spaced pair of side legs, may be stamped from the elongated strip between each pair of spaced side legs of the two spaced pair of side legs on each side of the central portion.

The end laminations may have a U-shape with legs extending from outer ends thereof, thus requiring corresponding reductions in the lengths of the side legs. The legs of such U-shaped end laminations may have varying lengths with corresponding extensions or reductions in the length of the side legs, as may be required.

Other methods for forming certain multi-pole motors include the forming of separate side and end laminations to form a combined lamination for use in a motor and include: stamping side laminations from an elongated strip each having a central portion with a rotor opening in at least one spaced pair of side legs extending from the central portion, adjacent side laminations being formed with at least one spaced pair of side legs of each side laminations in generally overlapped relationship to one another, and stamping at least one end lamination from each elongated strip for attachment to outer free extremities of the at least one spaced pair of side legs in each side lamination and with each end lamination being formed either transversely or longitudinally between the spaced pair of side legs of the side laminations. The adjacent side laminations may be formed with one pair of spaced legs extending generally transverse to another pair of spaced legs in an adjacent side lamination.

These and other objects and advantages of the aforementioned and other motor constructions and methods will become apparent from the specific and detailed description of the present invention that follows.

BRIEF DESCRIPTION OF THE DRAWINGS

In the drawings.

FIG. 6 is a sectional view of the two pole permanent split capacitor motor illustrated in FIG. 1 as viewed along lines 6—6 of FIG. 4;

FIG. 6A is an exploded side elevational view showing a design variation of the two pole permanent split capacitor motor of FIGS. 1–8;

FIG. 6B is an exploded side elevational view showing a further design variation of the two pole permanent split capacitor motor of FIGS. 1–8;

FIG. 17 is a perspective view of a six pole shaded pole motor constructed in accordance with the teachings of the present invention;

FIG. 18 is a side elevational view of the six pole shaded pole motor shown in FIG. 17;

FIG. 19 is a top plan view of the six pole shaded pole motor shown in FIG. 17;

FIG. 20 is an exploded side elevational view of the laminations and coils used in the six pole shaded pole motor illustrated in FIG. 17;

FIG. 35 is a side elevational view of a modified form of four pole shaded pole motor constructed in accordance with the teachings of the present invention;

FIG. 36 is an exploded side elevational view of the laminations and coils used in the modified four pole shaded pole motor shown in FIG. 35 of the drawings;

FIG. 37 is a side elevational view of a two pole switched reluctance motor constructed in accordance with the teachings of the present invention; and FIG. 38 is a side elevational view of a four pole switched reluctance motor constructed in accordance with the teachings of the present invention.

Corresponding reference numerals will be used throughout the several figures of the drawings.

DESCRIPTION OF THE PREFERRED EMBODIMENTS

Figure 1:
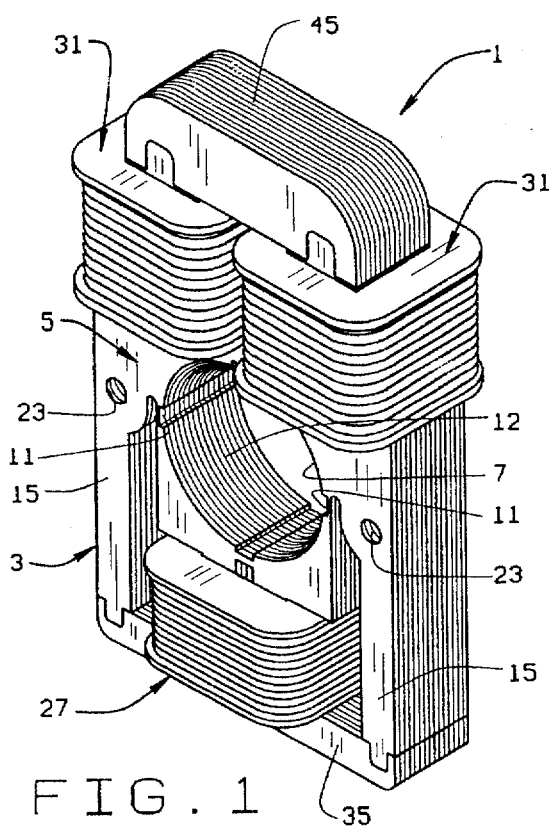
FIG. 1 is a perspective view of one form of low cost two pole permanent split capacitor motor constructed in accordance with the teachings of the present invention.
Figure 2:
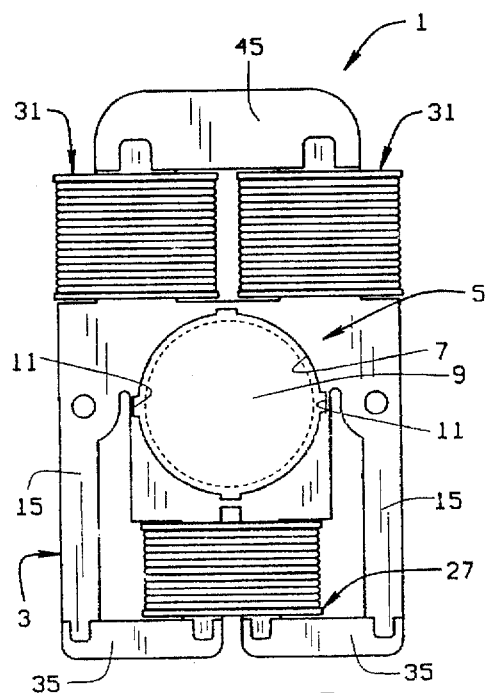
FIG. 2 is a side elevational view of the two pole permanent split capacitor motor illustrated in FIG. 1.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Prior to discussing the specific novel and unique aspects of the present invention in its various forms, reference is first of all made to the background environment and teachings of my aforementioned copending patent applications. For example, in my copending patent application Ser. No. 08/381,187 filed Jan. 31, 1995 entitled TWIN BOBBIN C-FRAME MOTORS AND METHODS FOR MAKING SAME, now U.S. Pat. No. 5,619,086, I have disclosed that both of the spaced side legs of a first stack of laminations can be usefully employed for coil winding purposes, whether made in the typical four-sided (square or rectangular) shape or in a higher order greater than four sides outer cross sectional shape. In either case, if the coil winding areas of the spaced side legs are positioned in proximity to aligned rotor openings of the first stack of laminations which receive a rotor, several important advantages are achieved. The mounting of the electrically conductive coils over the spaced side legs provides a greater and/or more efficient flow of magnetic flux in the magnetic inductor circuit than a conventional C-frame construction. The electrically conductive wire forming each electrically conductive coil that is positioned over each of the side legs cannot only have less than one-half the length of a single electrically conductive coil in a conventional magnetic inductor circuit, but the diameter of the electrically conductive wire can be reduced, as well. This diameter reduction is believed due to the shorter wire length of less than one-half length of a single electrically conductive coil, the greater winding surface area of the electrically conductive coils and the proximate location of the spaced electrically conductive coils on the spaced side legs relative to the aligned rotor openings and rotor. In my copending patent application Ser. No. 08/381,188 filed Jan. 31, 1995 entitled TWIN BOBBIN FOUR POLE MOTORS AND METHODS FOR MAKING SAME, now U.S. Pat. No. 5,627,424, I have further disclosed that a twin bobbin four pole motor can be constructed having spaced pairs of legs extending from opposite sides of a four pole central portion which includes a rotor opening for receiving a rotor. Electrically conductive coils are mounted over each leg of spaced pairs of legs on opposite sides of the central portion prior to the attachment of end legs across the spaced pairs of legs. As a result of this new and improved construction, substantial savings are possible not only as a result of the "footprint" of this design, but also as the result of the amount of material required for each electrically conductive coil. For example, an electrically conductive coil that is positioned over each of the spaced side legs on opposite sides of the central portion can have less than one-half the length of a single electrically conductive coil, in an equivalent magnetic conductor circuit, and the diameter of the electrically conductive wire can be reduced, due to the shorter wire length of a greater winding surface area of the electrically conductive coils. Even with a substantial material savings in the "footprint" and amount of material required for the electrically conductive coils, the operating performance or efficiency of such motors is not impaired since such motors have been designed with both end results in mind.

As will be seen in the discussion that follows, some of the principles disclosed in my aforementioned copending patent applications have been incorporated into one or more of the embodiments of the present invention, along with further novel and unique features that are directed to the specific constructions of the various motors that are now to be discussed in detail.

Figure 24:
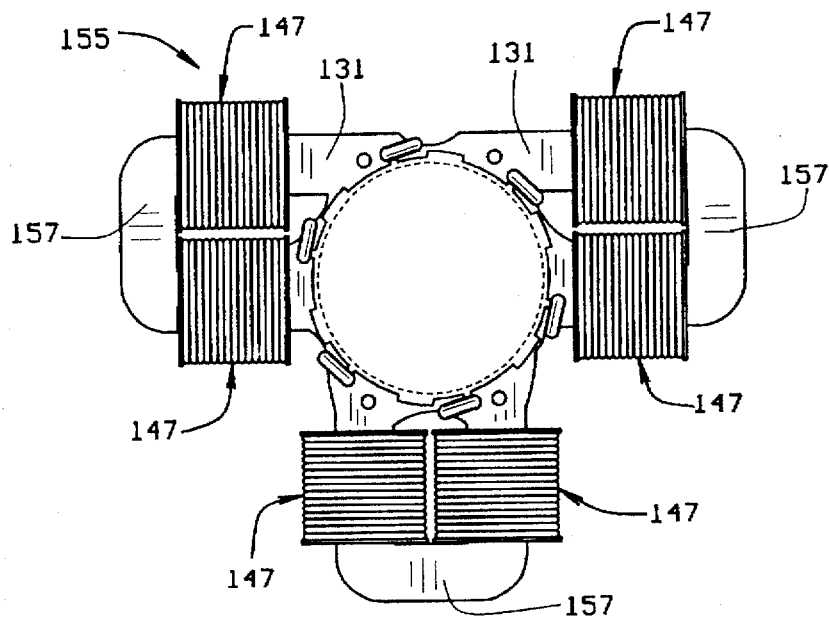
FIG. 24 is a side elevational view of a modified form of six pole shaded pole motor constructed in accordance with the teachings of the present invention.
Figure 25:
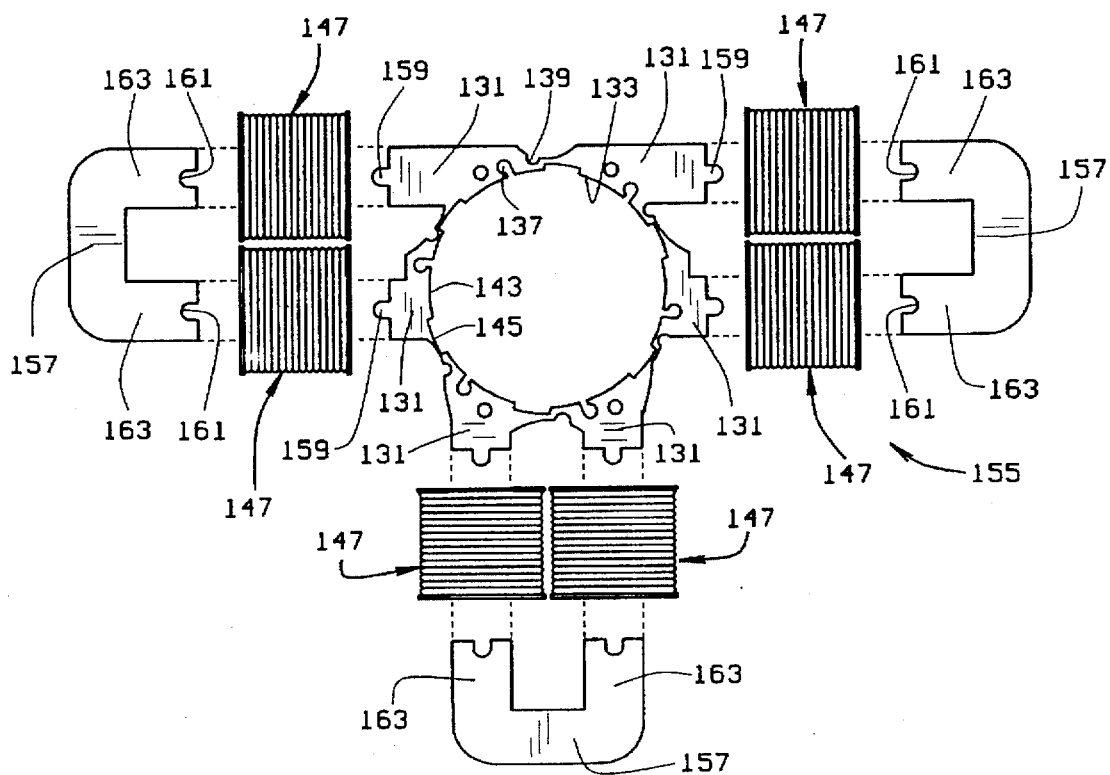
FIG. 25 is an exploded side elevational view of the laminations and coils used in the modified six pole shaded pole motor shown in FIG. 24.
Figure 26:
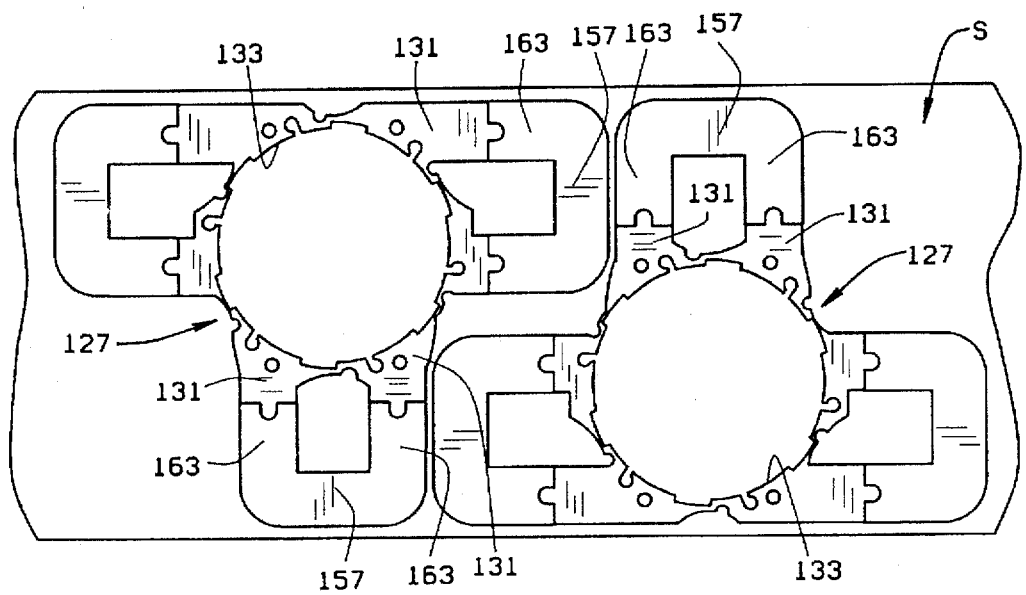
FIG. 26 is a die layout view illustrating a method of manufacturing laminations used in the modified six pole shaded pole motor illustrated in FIG. 24 of the drawings.
Figure 27:
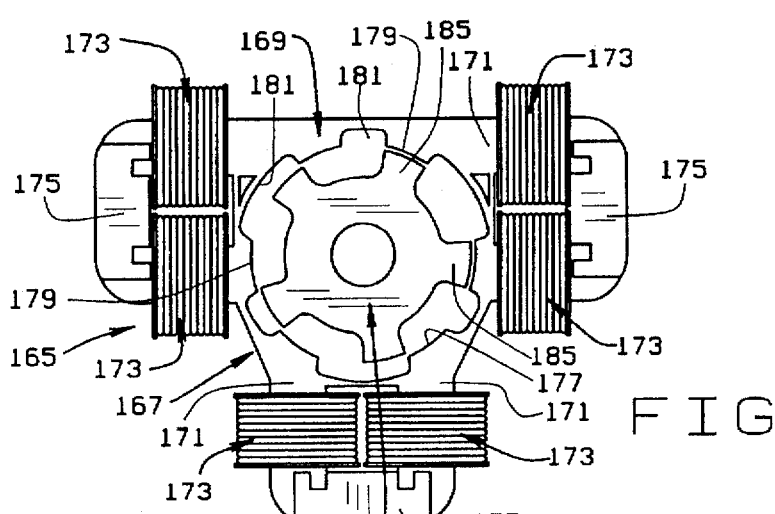
FIG. 27 is a side elevational view of a six pole switched reluctance motor constructed in accordance with the teachings of the present invention.
Figure 28:
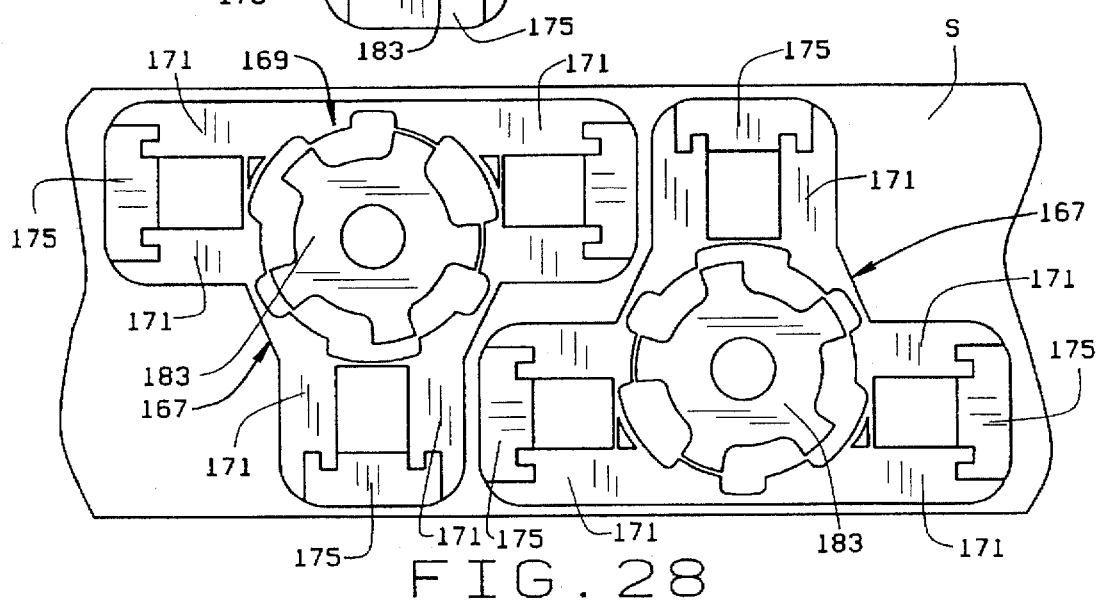
FIG. 28 is a die layout view illustrating in a method of manufacturing the laminations and rotor used in the six pole switched reluctance motor of FIG. 27.
Figure 43:
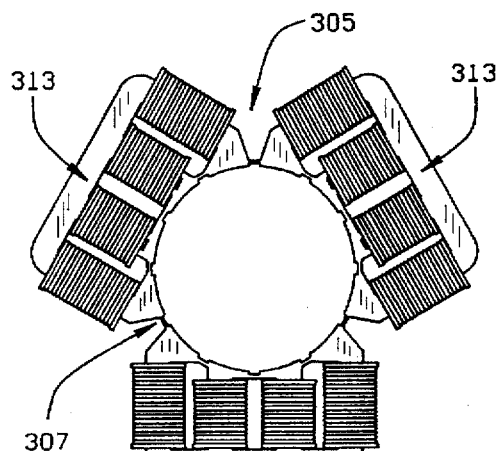
FIG. 43 is a side elevational view of a modified form of six pole permanent split capacitor from the construction illustrated in FIGS. 39–41.
Figure 44:
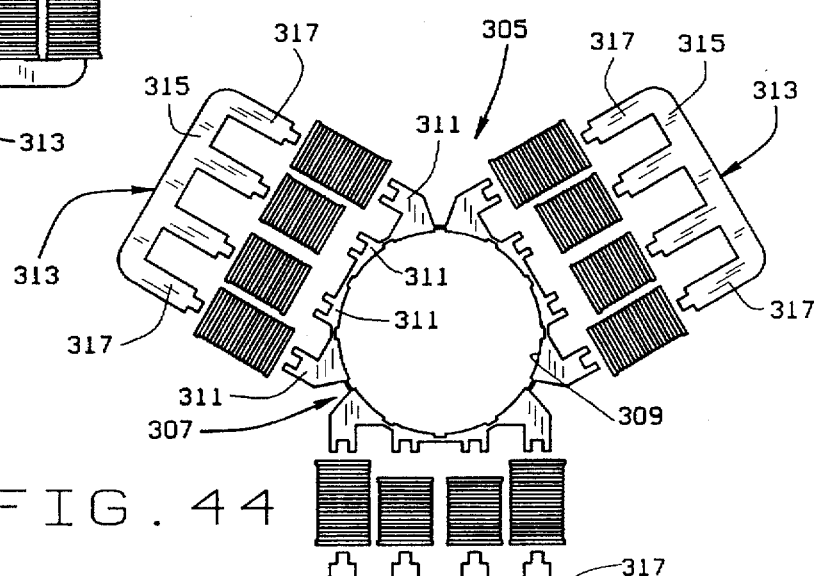
FIG. 44 is an exploded side elevational view of the six pole permanent split capacitor motor shown in FIG. 43.
Figure 45:
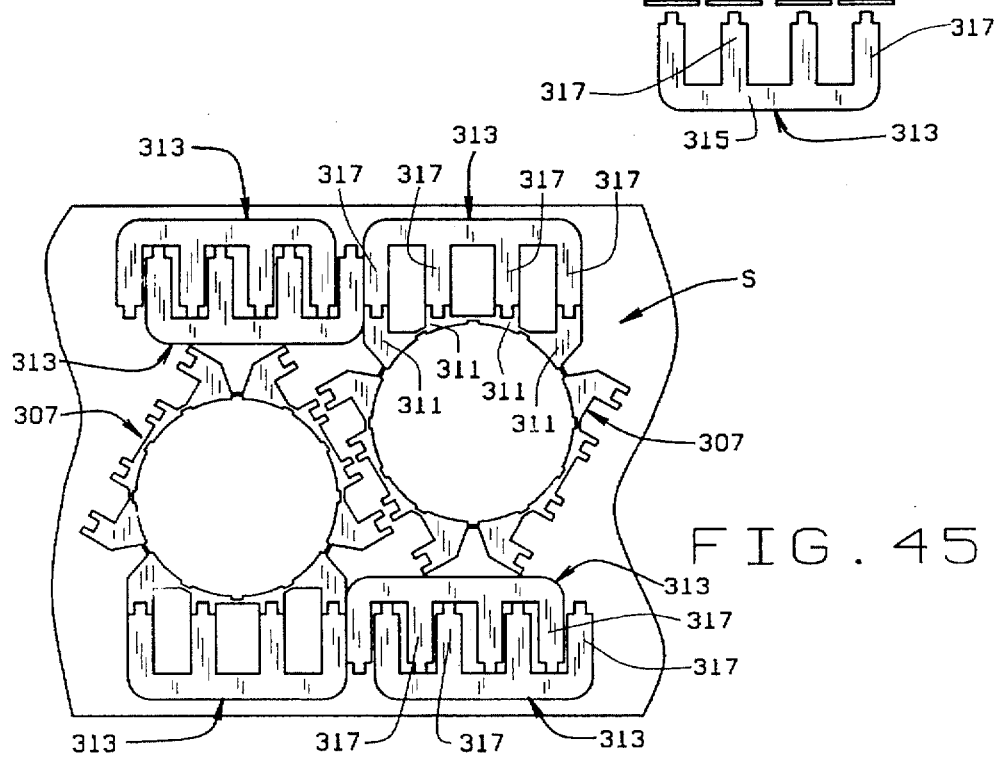
FIG. 45 is a die layout illustrating one method of manufacturing the laminations used in the six pole permanent split capacitor motor of FIGS. 43–44.

The present invention discloses multi-pole motor constructions and methods of manufacture in a variety of different embodiments including the following: FIGS. 1–8 disclose a two pole permanent split capacitor motor and the related method for manufacturing laminations used in such motor from an elongated strip; FIGS. 9–15 disclose a four pole permanent split capacitor motor and the related method for manufacturing laminations used in such motor; FIG. 16 discloses a four pole stepper motor constructed with laminations similar to the motor and method shown in FIGS. 9–15; FIGS. 17–23 disclose a six pole shaded pole motor and the related method for manufacturing laminations used in such motors; FIGS. 24–26 disclose a modified form of six pole shaded pole motor and the related method for manufacturing laminations used in such motors; FIGS. 27–28 disclose a six pole switched reluctance motor and the method for manufacturing laminations used in such motor; FIGS. 29–34 disclose an eight pole shaded pole motor and the related method for manufacturing laminations used in such motors; FIGS. 35–36 disclose a modified form of four pole shaded pole motor; FIGS. 37–38 show two pole and four pole switched reluctance motors; FIGS. 39–42 show a six pole permanent split capacitor motor and the related method of manufacturing laminations used in such a motor; FIGS. 43–45 show a modified form of six pole permanent split capacitor motor and the related method of manufacturing laminations used in such a motor; and FIGS. 46–49 show bobbin constructions for use in certain motor constructions.

All of the above motors are constructed in accordance with the teachings of the present invention and are based, in part, on the prior aforementioned copending patent applications. From these teachings, it will be apparent that other and different motors may be constructed even though not specifically illustrated in the drawings or described in the description that follows.

Reference is now made to each of the aforementioned embodiments of the present invention which will be described generally in the order listed above and as illustrated in the drawings.

The two pole permanent split capacitor motor 1 illustrated in FIG. 1–8 of the drawings includes a first stack of side laminations 3 formed from a series of magnetically conductive stacked laminations of identical configuration each having a multi-pole central portion 5 with a rotor opening 7 for receiving a rotor 9 also formed from a series of magnetically conductive stacked laminations of identical circular configuration. Around each rotor opening 7 are four thinned areas or reluctance gaps 11 generally arranged at a 12 o'clock, 3 o'clock, 6 o'clock and 9 o'clock position to define four shared half-poles 12.

Figure 3:
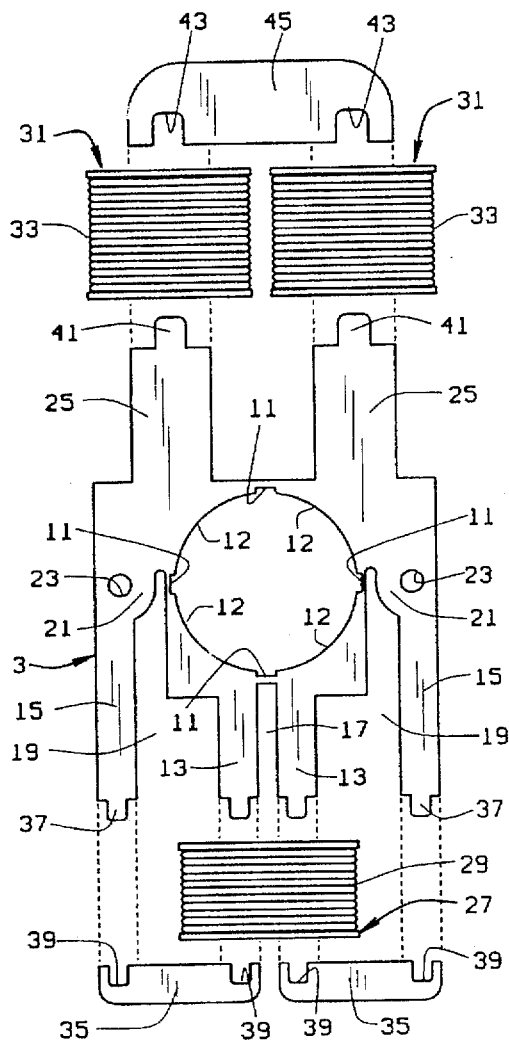
FIG. 3 is an exploded side elevational view of the two pole permanent split capacitor motor shown in FIG. 1.
Figure 4:
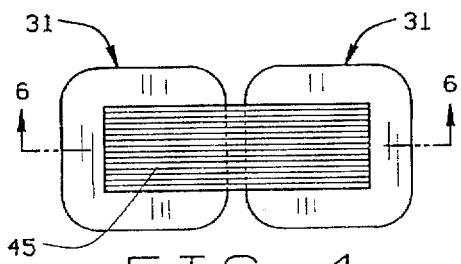
FIG. 4 is a top plan view of the two pole permanent split capacitor motor shown in FIG. 1.
Figure 5:
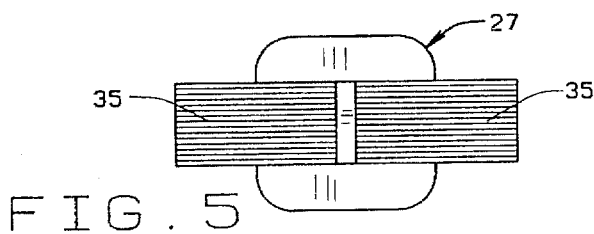
FIG. 5 is a bottom plan view of the two pole permanent split capacitor motor shown in FIG. 1.

Extending from one side of the multi-pole central portion are two spaced pairs of spaced side legs including a spaced pair of innermost side legs 13, 13 and a spaced pair of outermost side legs 15, 15, as best seen in FIG. 3 of the drawings. It will be noted that the spaced pair of innermost side legs 13, 13 are positioned on opposite sides of a reluctance gap 11 located at the 6 o'clock position in the rotor opening 7, while the two outermost legs 15, 15 are connected to the central portion 5 above the reluctance gaps 11, 11 located at the 3 o'clock and 9 o'clock positions in the rotary opening 7. Between the innermost legs 13, 13 is a generally rectangular-shaped gap 17 having a width corresponding to the width of the reluctance gap 11 located at the 6 o'clock position and a length slightly longer than the innermost legs 13, 13, as also best seen in the exploded view of FIG. 3 of the drawings. The two outermost spaced legs 15, 15 are spaced from the two innermost legs 13, 13 as well as the central portion 5 through mirror-image generally L-shaped openings 19, 19. The lower or horizontal portion of each L-shaped opening 19 spaces an adjacent innermost and outermost leg 13, 15, respectively, from each other, while a smaller upper or vertical portion of each generally L-shaped opening 19 spaces each outer leg 15 from the central portion 5. At the upper end of each L-shaped opening 19, adjacent one of the reluctance gaps 11 at either the 3 o'clock or 9 o'clock position in the rotor opening 7, the L-shaped opening 19 curves radially inwardly to provide an enlarged area 21, in order to accommodate a bolt opening 23 on opposite sides of each of the laminations 3. Each bolt opening 23 receives a mounting bolt (not shown) that supports a rotor bracket (not shown) which, in ram, supports the rotor 9 for rotation relative to the aligned rotor openings 7 in the stack of laminations 3. Thus, each of the outermost legs 15, 15 are spaced from the pair of innermost legs 13, 13, as well as the reluctance gaps 11, 11 at the 3 o'clock and 9 o'clock position of the rotor opening 7, while being connected to the multi-pole central portion 5 above the 3 o'clock and 9 o'clock reluctance gaps 11, 11.

On an opposite side of the multi-pole central portion 5 from the spaced pairs of innermost and outermost legs 13, 13 and 15, 15, respectively, is a single spaced pair of side legs 25, 25. Each of the side legs 25, 25 have approximately twice the width of the individual innermost and outermost side legs 13, 13 and 15, 15, on the other side of the multi-pole central portion 5.

A single insulating bobbin 27 with previously wound electrically conductive wire forms a coil 29 that is capable of being mounted over the two spaced innermost legs 13, 13 on one side of the central portion 5, while an insulating bobbin 31 with previously wound electrically conductive wire forming a coil 33 is capable of being mounted on each of the spaced stacked legs 25, 25 on an opposite side of the central portion 5. Each of the insulating bobbins are generally rectangular in shape corresponding to the generally rectangular shape of the outer cross sectional shape of each of the stacked innermost legs 13, 13 on one side of the central portion 5 and each of the generally rectangular shaped stacked legs 25, 25 on the other side of the central portion 5. It is of course, possible to provide a square shape for the stacked side legs or even a round shape, if desired, as disclosed in my copending patent application entitled CONTROLLABLE ADJUSTABLE MANUFACTURING METHOD AND APPARATUS FOR VARIABLE LAMINATIONS USED IN ELECTRO-MAGNETIC INDUCTION DEVICES identified by U.S. Ser. No. 08/372,035 filed Jan. 12, 1995, now U.S. Pat. No. 5,640,725.

After the insulating bobbin 27 is mounted on spaced innermost legs 13, 13 and the pair of bobbins 31, 31, are mounted on the spaced side legs 25, 25 on the opposite side of the multi-pole central portion 5, a second stack of magnetically conductive stacked end leg laminations is used for attachment to each of the outer free extremities of the spaced side legs, in order to provide a closed flux path. Specifically, a separate stack of magnetically conductive end laminations 35 is provided for attachment to the outer free extremities of each adjacent innermost and outermost leg 13, 15. Thus, each pair of innermost and outermost legs 13, 15 and 13, 15 are attached to separate stacks of magnetically conductive laminations 35,35. For this purpose, the outer free extremities of each of the innermost and outermost legs 13, 15, respectively, are provided with male fastening elements 37 for complementary mating engagement with corresponding shaped recesses 39 formed in each of the stacked end laminations 35, 35. With respect to the spaced stack legs 25, 25 on the opposite side of the multi-pole central portion 5, a male fastening element 41 is provided at the outer free extremity of each leg 25 for mating engagement with a complementary shaped recess 43 formed in the stacked end laminations 45 that are mounted to the outer free extremities of the spaced stacked legs 25, 25.

If desired, the end laminations 35, 35 and/or 45 may have a U-shape with legs extending from outer ends thereof, thus requiring corresponding reductions in the length of the side legs 13, 15 and 13, 15 on one side of the multi-pole central portion 9 and/or the spaced legs 25, 25 on an opposite side. This option is shown in connection with the FIGS. 6A and 6B.

Specifically, the end laminations 35, 35 and 45 may have two different types of U-shaped configurations, as shown in FIGS. 6A and 6B. In FIG. 6A, each of the U-shaped end laminations 35 are provided with spaced legs 36, 36 having recesses 38, 38 for receiving the male tabs 40, 40 extending from corresponding areas of the central portion 5. The end lamination 45 is similarly constructed in a U-shape with spaced legs 42, 42 having recesses 44, 44 for receiving the male tabs 46, 46 from corresponding areas of the central portion 5. Of course, the recesses and tabs could be reversed, if desired, with male tabs on the spaced legs and recesses in the central portion 5. FIG. 6B is similar to FIG. 6A except that the spaced legs 13, 13, 15, 15 and 25, 25 are shortened to cooperate with smaller U-shaped end laminations 35, 35 and 45, as illustrated.

Figure 6C:
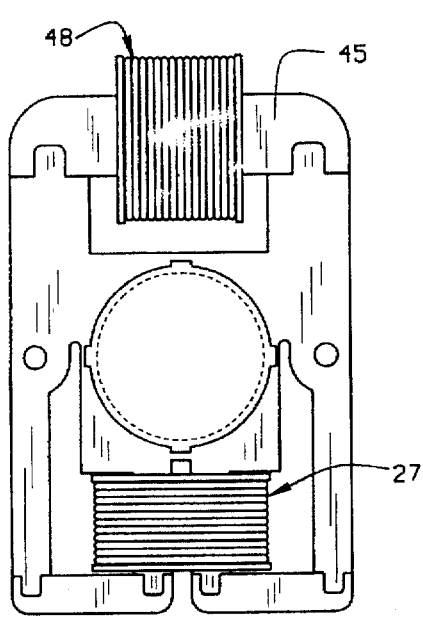
FIG. 6C is a side elevational view showing still a further design variation of the two pole permanent split capacitor motor of FIGS. 1–8.
Figure 6D:
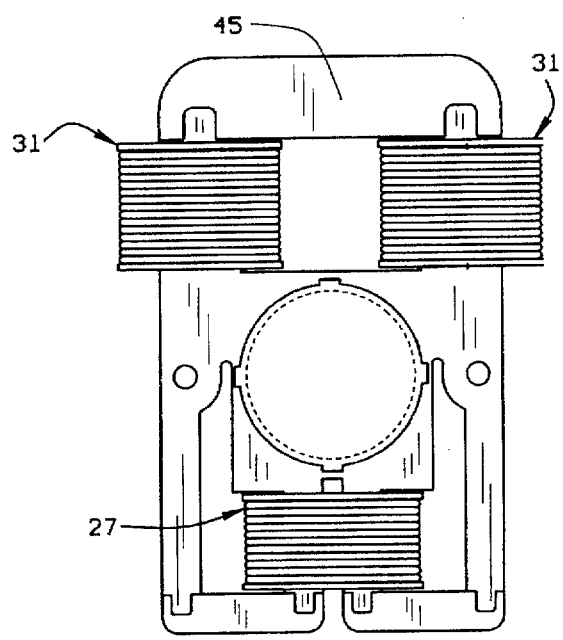
FIG. 6D is a side elevational view showing even still a further design variation of the two pole permanent split capacitor motor of FIGS. 1–8.

FIGS. 6C and 6D show other possible variations of the two pole permanent split capacitor motor 1. In FIG. 6C, a single auxiliary coil 48 is wound about the end lamination 45 in place of the spaced auxiliary windings 31, 31. The single auxiliary coil 48 would require an equivalent number of windings as compared to the spaced auxiliary windings 31, 31. FIG. 6D shows the end lamination 45 as well as the side laminations 3 such that the width of the side laminations have a constant width throughout, rather than having a stepped area for receiving the spaced coils 31, 31 within the width dimension of the side laminations 3, as shown in FIG. 6. Thus, in FIG. 6D, the spaced coils project laterally outwardly beyond the width of the side laminations 3 as a possible design variation, if desired. FIG. 6A through 6D serve as examples of possible design variations that can be incorporated into the two pole permanent split capacitor motor, if desired.

Figure 7:
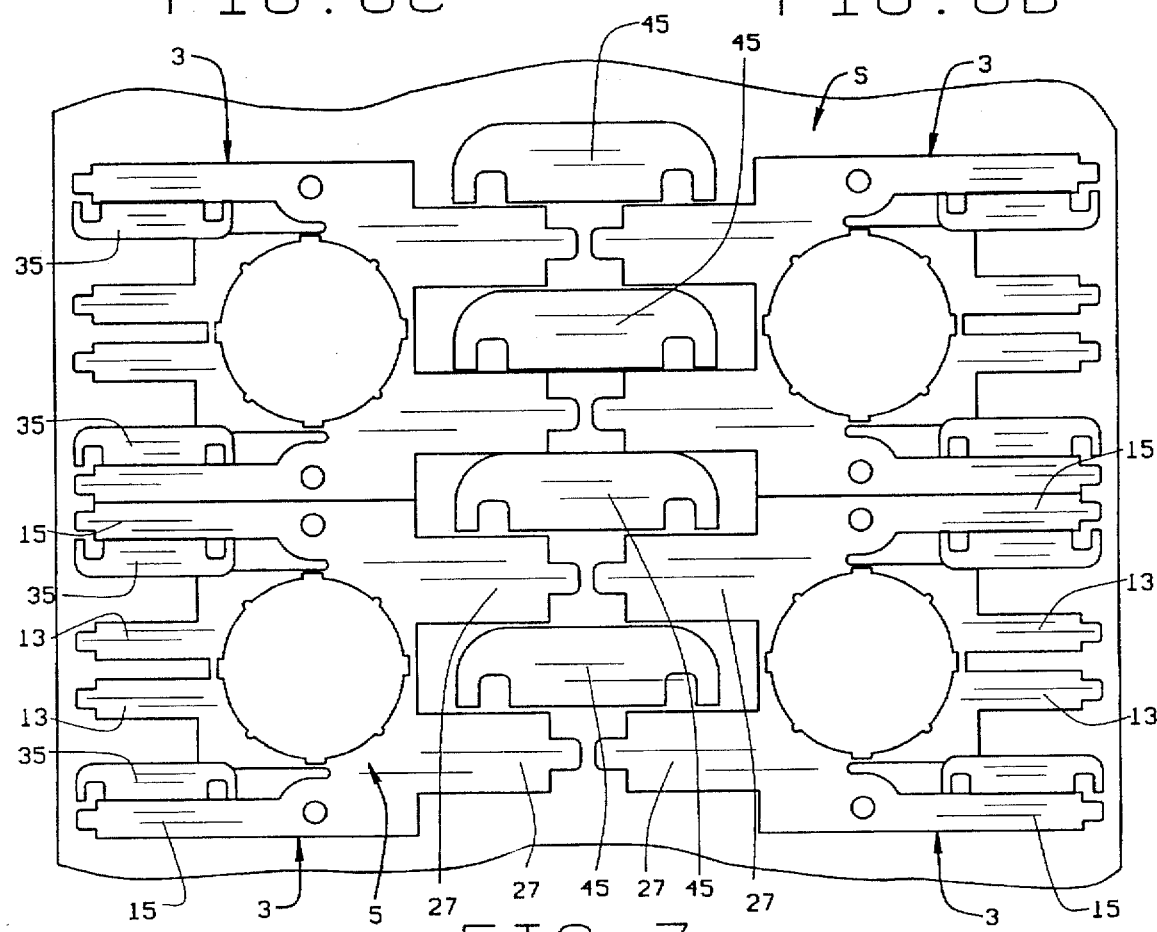
FIG. 7 is a die layout view illustrating the method of manufacturing laminations used in the two pole permanent split capacitor motor illustrated in FIG. 1.
Figure 8:
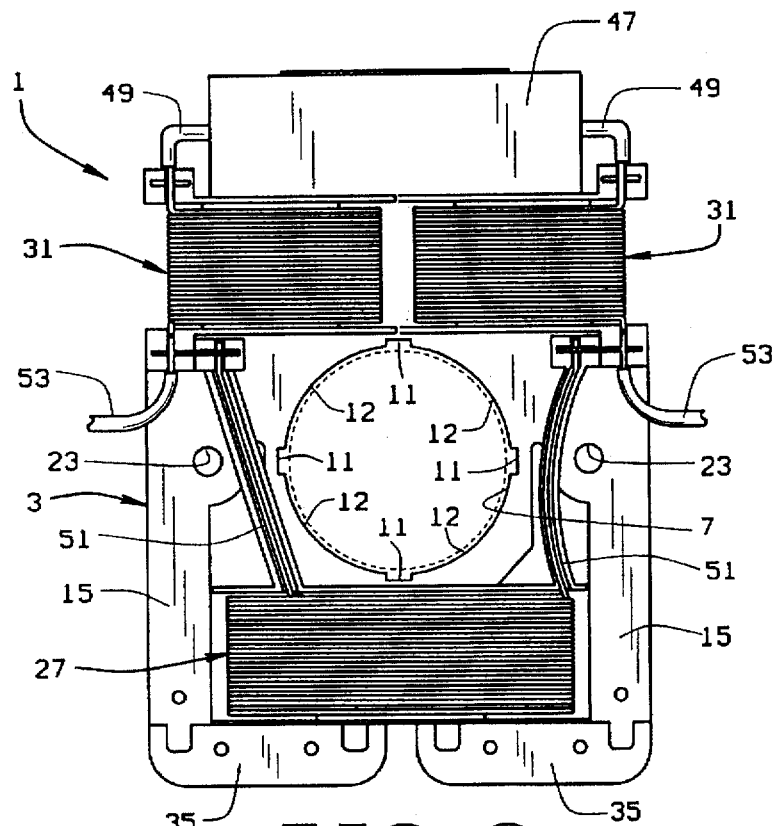
FIG. 8 is a side elevational view of the two pole permanent split capacitor motor shown in FIG. 1 and further illustrating the connections between the various auxiliary and main coils and associated capacitor as an example of one way in which main and auxiliary windings may be connected to each other and to a capacitor.

Reference is now made to FIG. 8 of the drawings for the manner in which the coils 27 and 31, 31 are connected to one another and to a capacitor in forming the two pole permanent split capacitor motor of FIG. 1–8. The two spaced coils 31, 31 may serve as auxiliary windings while the coil 27 may serve as a main winding; alternatively, the two spaced coils 31, 31 may serve as main windings with the single winding 27 serving as an auxiliary winding. The windings may be also connected in series or in parallel with one another, in various different arrangements, as may be desired.

In the FIG. 8 illustration, the two coils 31, 31 are connected by the leads 49, 49 in series to the capacitor 47 while each of the coils 31, 31 are also connected in parallel through the leads 51, 51 to the single coil 27 on the opposite side of the multi-central portion 5. Line leads 53 are also connected to each of the spaced coils 31, 31, as illustrated.

With a two pole permanent split capacitor motor 1 constructed in the manner described above, the operation of such motor will now be described. From the main winding 27, the flux flows through the rotor 9 generally in the 6–12 o'clock direction, while the flux path through the rotor 9 from the auxiliary winding 31 is generally in the 3–9 o'clock direction. Their axes are therefore displaced 90 electrical degrees in space. Since the capacitor 47, in series with the auxiliary winding causes its current to lead the main winding current, the stator field reaches a maximum along the axis of the auxiliary winding first and then somewhat later in time reaches a maximum along the axis of the main winding. The winding currents are equivalent to 2-phase currents, and the motor 1 is equivalent to a 2-phase motor. The result is a rotating stator field that causes the rotor 9 to turn.

Because of their higher efficiencies, capacitor motors are used in applications where not only higher efficiencies are required, but also where reversible motors are desired. Applications of capacitor motors, such as the two pole permanent split capacitor motor 1 of the present invention, are in refrigerators, fans and blowers.

The method of forming the side and end laminations 3 and 35, 45 used in the two pole permanent split capacitor motor 1 of the present invention can best be understood by reference to FIG. 7 of the drawings. As shown in FIG. 7, one preferred method of forming each of the magnetically conductive stacked side laminations 3 from an elongated strip S of magnetically conductive material includes the manufacture of adjacent side laminations 3, 3 in generally opposed mirror image relationship to one another, along the length of an elongated strip S of magnetically conductive material, with the spaced side legs 25, 25 in one side of the central portion 5 extending longitudinally and in mirror image relationship to one another. The spaced end laminations 35, 35, for attachment to adjacent outermost and innermost legs 13, 15 on an opposite side of the central portion 5, are formed in the longitudinal spaces between adjacent innermost and outermost legs 13, 15. As illustrated, the end laminations 45 are formed between the spaced side legs 27, 27 in the space between two adjacent pairs of mirror image spaced side legs 27, 27 of adjacent mirror image side laminations 3. By stamping the end laminations 35, 35 for one end of each side lamination 3 and the laminations 45 for the other end of each side lamination 3 while producing side lamination 3 at the same time, a lower cost, scrap efficient and continuous stamping method of producing such side and end laminations at the same time can be achieved. Rotor laminations may be formed either prior to or at the same time the side and end laminations are formed.

Figure 11:
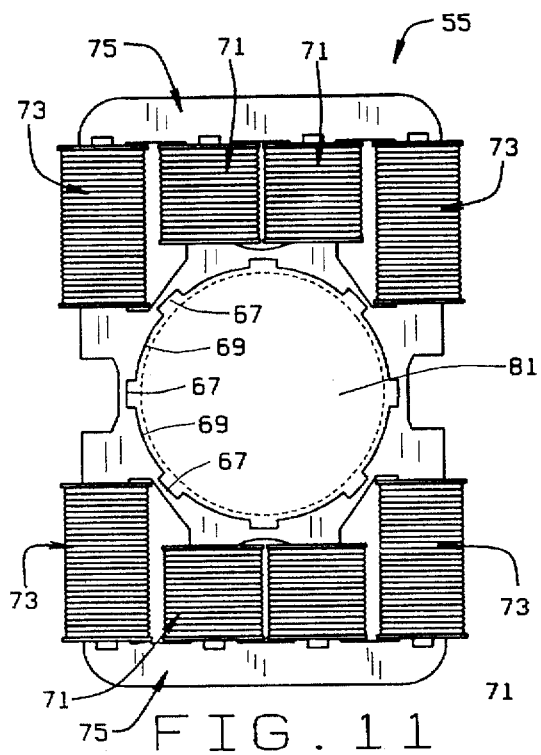
FIG. 11 is a side elevational view of the four pole permanent split capacitor motor construction shown in FIG. 10.
Figure 12:
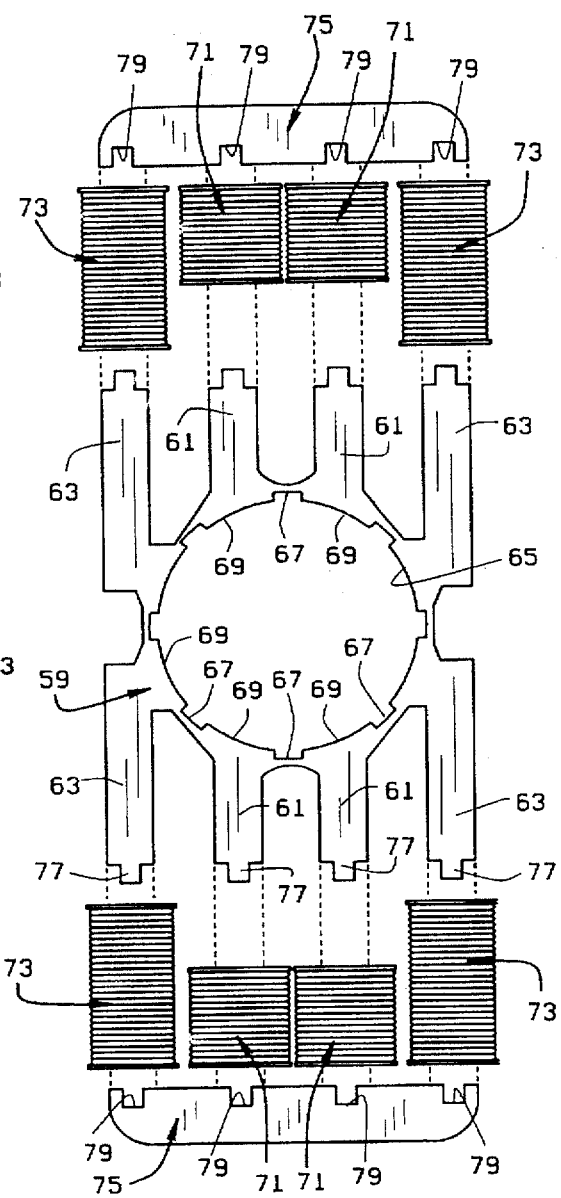
FIG. 12 is an exploded side elevational view of the four pole permanent split capacitor motor laminations and coils shown in FIG. 10.
Figure 13:
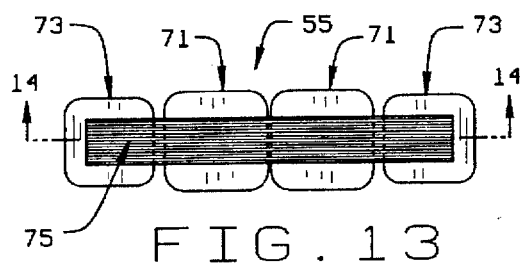
FIG. 13 is a top plan view of the four pole permanent split capacitor motor shown in FIG. 10.
Figure 14:
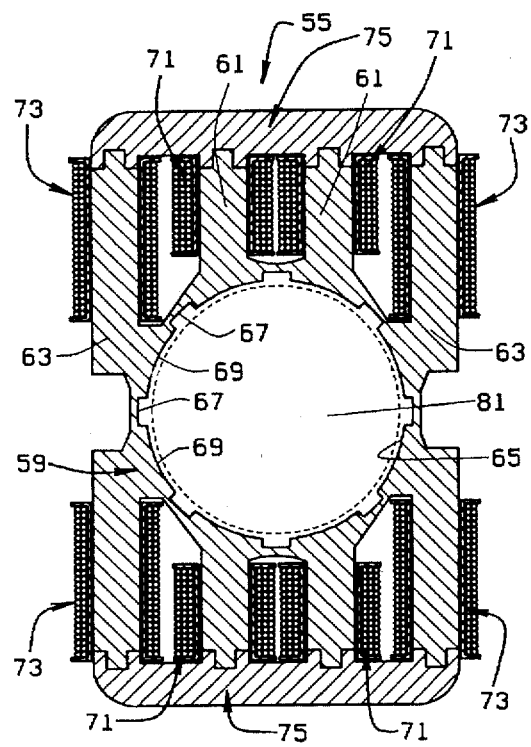
FIG. 14 is a sectional view of the four pole permanent split capacitor motor illustrated in FIG. 1 as viewed along lines 14—14 of FIG. 13.
Figure 15:
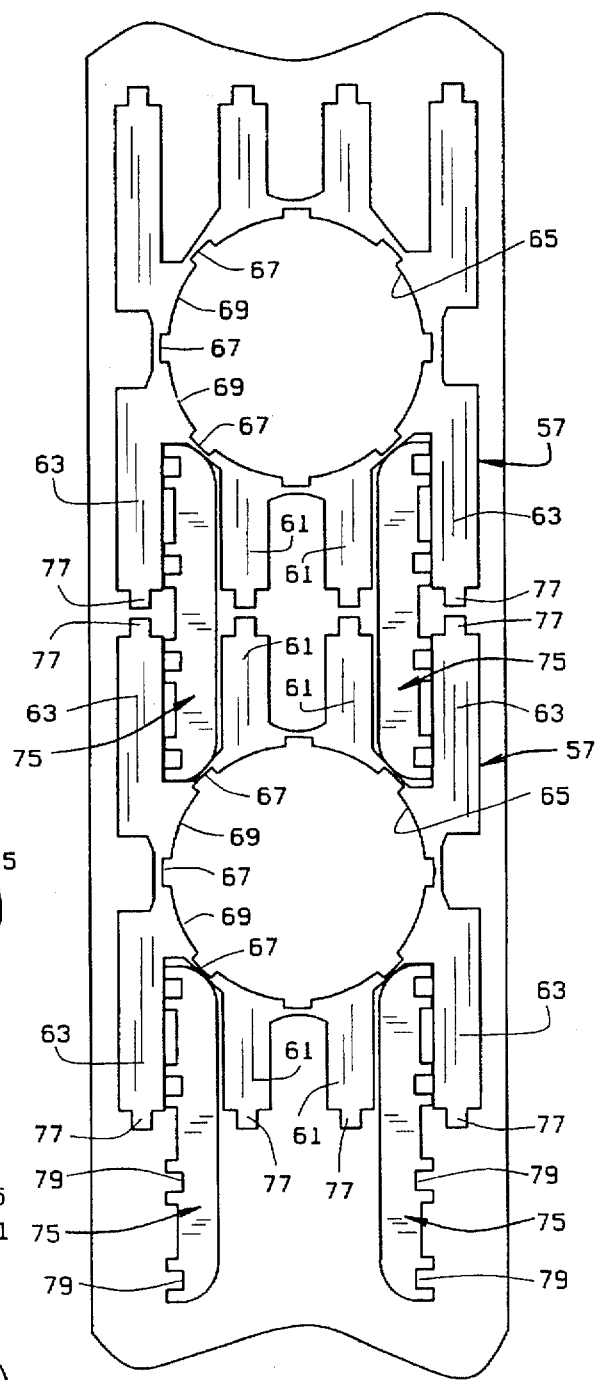
FIG. 15 is a die layout view illustrating a method of manufacturing the laminations used in the four pole permanent split capacitor motor illustrated in FIGS. 10–14.
Figure 16:
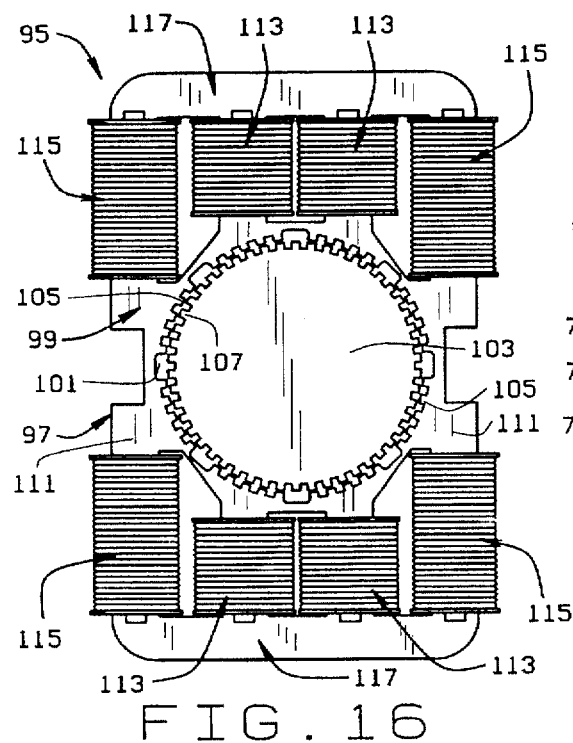
FIG. 16 is a side elevational view of a four pole stepper motor constructed in accordance with the teachings of the present invention.

Reference is now made to the four pole permanent split capacitor motor 55 illustrated in FIGS. 9–14 of the drawings, as well as the related method of manufacturing the side and end laminations for such motors shown in FIG. 15. Referring first to FIGS. 10–14 of the drawings, the four pole permanent split capacitor motor 55 includes a first stack of side laminations 57 formed from a series of magnetically conductive stacked laminations each having a multi-pole central portion 59 with two spaced pairs of side legs on each side of the central portion 59. Specifically, the two spaced pairs of side legs on each side of the central portion include a spaced pair of innermost side legs 61,61 and a spaced pair of outermost side legs 63, 63 on opposite sides of the spaced innermost side legs 61, 61. As best seen in FIG. 12 of the drawings, each of the innermost side legs 61 on one side of the multi-pole central portion 59 are in mirror image relationship to an adjacent innermost side leg 61, in a horizontal direction, while also being in mirror image relationship to an innermost side leg 61 on an opposite side of the multi-pole central portion 59, in a vertical direction. Similarly, each of the outermost legs 63 on one side of the multi-pole central portion 59 are in mirror image relationship to each other, in a horizontal direction, while being in mirror image relationship to an outermost side leg 63 on an opposite side of the central portion 59, in a vertical direction. The multi-pole central portion 59 has a rotor opening 65 with gaps producing thinned areas 67 that separate the inner pole faces 69 of adjacent legs from one another. Thus, as seen in FIG. 12, for example, the thinned area 67 at the 12 o'clock position separates the two innermost legs 61, 61 and their corresponding inner pole faces 69, 69 from one another. The multi-pole central portion 59 is illustrated as having eight half-poles 69. This is important in producing the phase shifting in the four pole permanent split capacitor motor 55, as will be subsequently discussed.

Each of the spaced innermost legs 61, 61 receive electrically conductive coils 71, 71, and the outermost legs 63, 63 receive electrically conductive coils 73, 73 on each side of the multi-pole central portion 59. As seen in FIGS. 10–14, the two innermost coils 71, 71 have a shorter length than the two outermost coils 73, 73, due to the difference in length between the two innermost legs 61, 61 and the two outermost legs 63, 63. Alternatively, the bobbins 71, 73 may have the same length as shown, for example, in the modified coil arrangement illustrated in FIG. 9 of the drawings.

After the coils 71, 71 and 73, 73 are placed on the spaced innermost legs 61, 61 and spaced outermost legs 63, 63 on opposite sides of the multi-pole central portion 59, a second stack of end laminations 75, formed by a corresponding number of separate magnetically conductive stacked laminations, is attached to the first stack of side laminations 57 at the outer free extremities of the spaced innermost legs 61, 61 and spaced outermost legs 63, 63 on opposite sides of the multi-pole central portion 59. Each of the second stack of end laminations 75 constitute a second or separate end leg which, when used with the first stack of side laminations, provides a closed flux path. If desired, one or both of the end laminations 75 may have a U-shape with legs extending from opposite ends, thus requiring reduction in length in spaced innermost and outermost legs 61, 61 and 63, 63 on one or both sides of the multi-pole central portion 59. This has been explained in connection with the FIGS. 6A and 6B, for example.

For attaching the first stack of laminations 57 to each of the second stack of laminations 75, 75 in the FIGS. 9–14 embodiment, the outer free extremities of each of the innermost and outermost stacked legs 61, 61 and 63, 63, respectively, are provided with an outwardly extending male tab 77 for complementary reception within a correspondingly shaped aligned recess or opening 79 formed in each of the second stack of laminations 75.

As best illustrated in FIG. 11 of the drawings, it will be noted that when each of the coils 71, 71 and 73, 73 are mounted on opposite sides of the multi-pole central portion 59 in the four pole permanent split capacitor motor 55 of the present invention, each of the electrically conductive coils 71, 71 and 73, 73 are mounted in close proximity to an adjacent pole face or shared half-pole 69. The aligned rotor opening 65 in the side lamination 57 receive a rotor 81 that is driven by flux generated through the aforementioned coils and shared half-poles of the motor 55, in a manner now to be described, with specific reference to FIG. 9 of the drawings.

Figure 9:
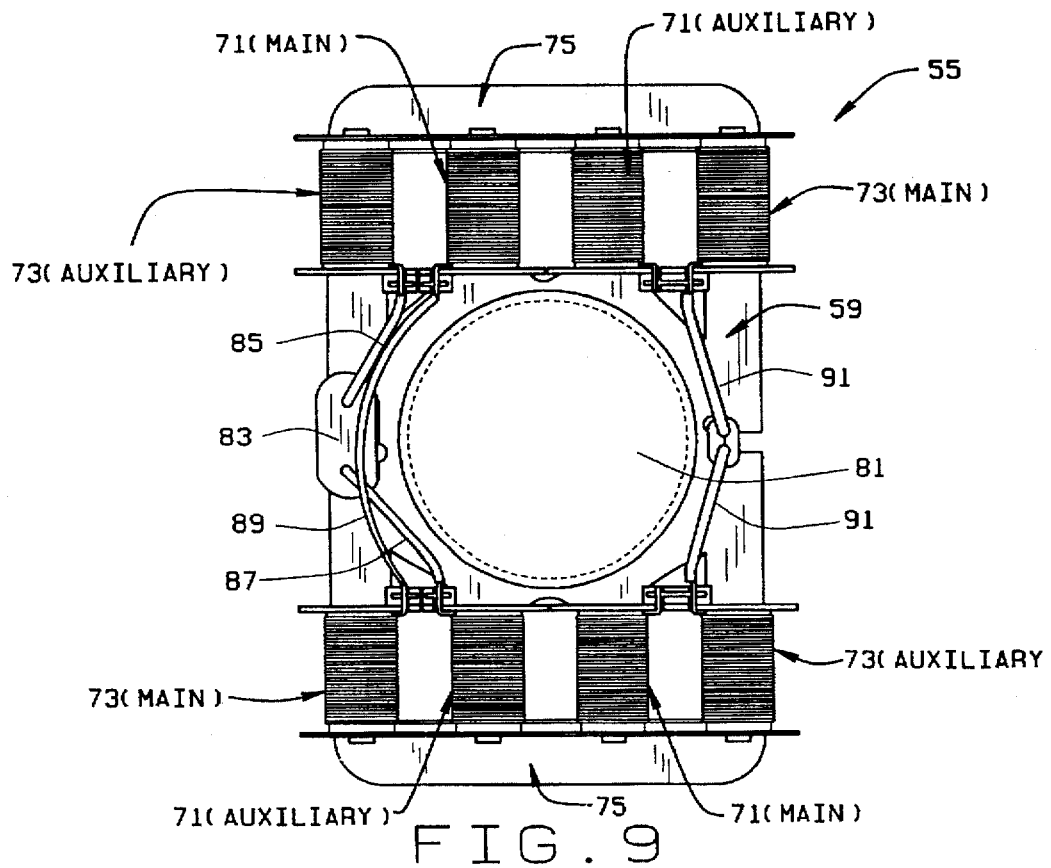
FIG. 9 is a side elevational view of a four pole permanent split capacitor motor of the type specifically illustrated in FIGS. 10–16 of the drawings and illustrating connections between auxiliary and main coils and a capacitor forming the four pole permanent split capacitor motor.
Figure 10:
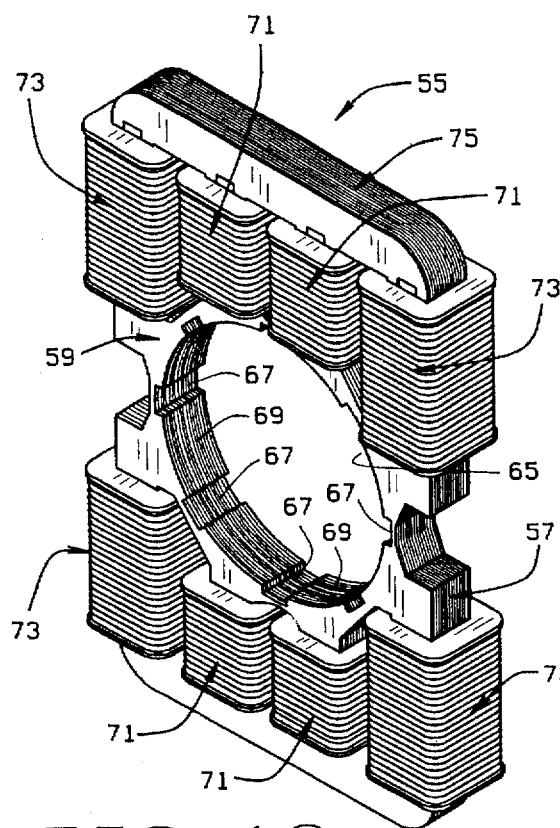
FIG. 10 is a perspective view of a four pole permanent split capacitor motor also constructed in accordance with the teachings of the present invention.

As best seen in FIG. 9 of the drawings, each of the coils on opposite sides of the central portion 59 are positioned in alternating arrangement as auxiliary and main coils. Specifically, in the upper part of the motor 55, the leftmost coil 73 is an auxiliary coil, the coil 71 immediately to its right is a main coil, the coil next immediately to the right is an auxiliary coil 71 and the coil to the farthest right is a main coil 73. Below the multi-pole central portion 59, the leftmost coil is a main coil 73, the next coil to its right is an auxiliary coil 71, the next coil is a main coil 71, and the coil to the farthest right is an auxiliary coil 73. Each of the four main coils 71, 73 on opposite sides of the central portion are connected in series. Each of the four auxiliary coils 71, 73, on opposite sides of the central portion 59, are also connected in series with each other and capacitor 83. Specifically, it will be seen that the rightmost auxiliary coil 71 above the multi-pole central portion 59 has one end connected to upper line lead 91 and the other end connected to one end of the leftmost auxiliary coil 73, the other end of which is connected through lead 85 to capacitor 83. The other capacitor lead 87 is connected to one end of the leftmost auxiliary coil 71 below the central portion 59, the other end of the leftmost auxiliary coil 71 being connected to rightmost auxiliary coil 73. The other end of the rightmost auxiliary 73 is connected to lower line lead 91. The rightmost main coil 73, above the multi-pole central portion 59, has one end connected to upper line lead 91 and the other end connected to one end of the leftmost main coil 71. The other end of the leftmost main coil 71 is connected through jumper lead 89 to one end of the leftmost lower main coil 73. The other end of the leftmost lower main coil 73 is connected to the lower rightmost main coil 71. The other end of the lower rightmost main coil 71 is connected to lower line lead 91.

With a four pole permanent split capacitor motor 55 constructed in the manner described above, the operation of such motor will now be described.

Consider the top and bottom halves of the stator 57 of FIG. 9 to be two separate two pole stators operating on the top and bottom halves of the rotor 81, respectively. Then, it can in space from the two upper auxiliary windings. The same is true for the lower half of the be seen that the two upper main windings are displaced 45 mechanical or 90 electrical degrees stator. Since the capacitor 83, in series with both the upper and lower auxiliary windings causes the current in both auxiliary windings to lead the current in both main windings, the stator winding reaches a maximum along the electrical axes of the auxiliary windings first and then somewhat later in time reaches a maximum along the electrical axis of the main windings. The winding currents are equivalent to 2-phase currents, and the motor 55 is equivalent to a 2-phase motor. The result is a rotating stator field that causes the rotor 81 to turn.

For the related method of manufacturing side and end laminations 57 and 75 of the four pole permanent split capacitor motor 55, reference is made to FIG. 15 of the drawings which shows a die layout for the manufacture of such laminations from an elongated strip S of magnetically conductive material. There, it will be seen that adjacent side laminations 57, 57 are arranged in sequential relationship to one another with the end laminations 75, 75 being formed in the spaces between the innermost and outermost legs 61, 63 of adjacent laminations 57, 57, as illustrated. This pattern repeats throughout the die layout, thus facilitating the simultaneous stamping of adjacent side and end laminations 57, 75, respectively, in a scrap efficient and economical method, as will be apparent. Rotor laminations 81 will also, or course, be stamped from the rotor opening 65, either prior to or at the same time the side and end laminations are formed.

A six pole permanent split capacitor motor and the related method of manufacture is described below in connection with FIGS. 39–42 of the drawings, after various four pole, six pole, and eight pole motor constructions are described in FIGS. 16–38 below.

A four pole stepper motor 95, having a construction generally similar to the four pole permanent split capacitor motor 55 of FIGS. 9–15 of the drawings, is illustrated in FIG. 16. The four pole stepper motor 95 includes magnetically conductive stacked side laminations 97 having a general overall construction similar to the side laminations 57 in FIGS. 9–15. Each side lamination 97 has a multi-pole central portion 99 with a rotor opening 101 for receiving a rotor 103. A circumferential series of inwardly directed teeth 105 are circumferentially spaced around the rotor opening 101 with a permanent magnet rotor 103 having a circumferential series of outwardly directed teeth 107 that are offset by one tooth on opposite ends of the rotor 103. Each of the side laminations 97 include spaced innermost legs 109, 109 and spaced outermost legs 111, 111 on opposite sides of the multi-pole central portion 99. Bobbin wound electrically conductive coils 113, 113 are positioned over the spaced innermost legs 109, 109 while bobbin wound electrically conductive coils 115, 115 are mounted over the spaced outermost legs 111, 111 on each side of the multi-pole central portion 99. Separate magnetically conductive stacks of laminations 117, 117 are attached to the outer free extremities of the innermost and outermost legs 109, 109 and 111, 111, through suitable complementary male/female fasting elements, in order to form the closed flux path.

The stepper motor 95 operates in the following described manner. Four alternate poles of the eight poles are connected with alternate polarity to one phase of a two phase power source. The other four poles are connected with alternate polarity to the other phase of the two phase power source.

The rotor 103 is a permanent magnet axially aligned with one end being a north pole and the other a south pole. Therefore, one half of each tooth on the rotor is a north pole and the other half is a south pole. The teeth on the rotor on one end are offset by one tooth from those on the other half so that magnetic repulsion on one half causes movement of the rotor 103 in the same direction as magnetic attraction does on the other half. The teeth on the stator poles and the rotor are arranged so the teeth on one set of same phase connected poles are offset 90 electrical degrees one-half tooth width from alignment with the rotor pole teeth when the other set of stator pole teeth are in alignment or completely out of alignment with the rotor teeth. This corresponds to the 90 degree phase shift between phases of the two phase power source, causing alternate peak magnetic pull between the rotor teeth and the two sets of phase connected stator pole teeth, thus causing rotation with direction depending on the polarity chosen for the two phase connections.

As in the previous embodiments, by enabling the coils 113, 113 and 115, 115 to be mounted over the spaced innermost and outermost legs 109, 109 and 111, 111 on each side of the multi-pole central portion 99, the four pole stepper motor 95 of the present invention utilizes the construction and manufacturing efficiencies of C-frame motors. This can be achieved, while allowing a circumferential series of inwardly directed teeth 105 to be provided around the rotor opening 101 and a corresponding circumferential series of outwardly directed teeth 107 around the rotor 103 in the stepper motor 95 construction of the present invention.

Other types of motors having inwardly directed teeth or poles for cooperation with corresponding poles on the rotor may also be constructed in accordance with the teachings of the present invention, as the switched reluctance motors described below.

The method of forming the side and end laminations 97 and 117, in the stepper motor 95, generally follows the method described above in connection with FIG. 15 of the drawings, except for the stator teeth 105. This will be understood as there is substantial similarity in the overall construction of the four pole permanent split capacitor motor 55 of FIGS. of 9–15 and the stepper motor 95 in FIG. 16 of the drawings.

The present invention also contemplates the manufacture of a six pole shaded pole motor and its related method of manufacture, as illustrated in FIGS. 17–23 of the drawings. The six pole shaded pole motor 125 includes a first stack of side laminations 127 formed from a series of magnetically conductive stacked laminations each having a six pole central portion 129 with three spaced pairs of side legs 131 circumferentially spaced about the six pole central portion 129, as best seen in FIG. 20 of the drawings. While the three spaced pairs of side legs 131, 131 may be circumferentially spaced around the six pole central portion 129 in any preferred manner, as illustrated in FIG. 20 of the drawings, one preferred embodiment includes forming two spaced pairs of side legs 131,131 and 131,131 in mirror image relationship to one another, while the third pair of spaced side legs 131, 131 extends generally transverse to the other two spaced pairs of side legs 131, 131 and 131, 131. A combined stack of side laminations 127 provides three pairs of circumferentially spaced side legs 131, 131 around the stacked central portion 129 in order to provide the first stack of laminations 127, as best illustrated in FIG. 17 of drawings. A rotor opening 133 is provided in the six pole central portion 129 of each side lamination 127 which, when aligned with the rotor openings 133 of adjacent six pole central portions 129 of stacked side laminations 127, provides an aligned rotor opening 133 in the stacked six pole central portions 129 for receiving a rotor 135, as illustrated in FIG. 18 of the drawings.

The six pole motor 125 of FIGS. 17–23 is of the shaded pole motor type which includes shading coils to produce starting torque and rotation of the rotor 135. For this purpose, each of the stacked side laminations 127 are provided with six pairs of inner and outer cooperating openings 137, 139 for receiving shading coils 141, as best seen in FIGS. 17–18 of the drawings. Each of the shading coils 141 are formed by a loop of copper or other electrical conductor which is arranged to encircle one of the six poles 143 of the six pole shaded pole motor 125. Each of the six poles 143, of the six pole shaded pole motor 125, are offset by thinned areas 145 which are generally equally circumferentially spaced between the six poles 143 around the rotor opening 133. It will be noted that the shading coils 141 are received in relatively deep openings 137 in the legs 131 while the outer shaded coil opening 139 is angularly offset from the inner opening 137, in order to avoid a deep opening or notch in the six pole central portion 129 that would structurally weaken or otherwise interfere with the flux path. At the same time, the shading coils 141 are received in each pair of cooperating openings 137, 139 in the desired manner.

As in the previous embodiments, each of the stacked side legs 131 of the stacked side laminations 127 have a combined predetermined outer cross sectional configuration coil winding area, generally shown to be rectangular in shape, although other cross sectional shapes may be used, as indicated above. For mounting over each of the stacked side legs 131 of the stacked laminations 127, bobbin wound electrical coils 147 are provided. Thus, there are six coils 147 for the circumferentially spaced six legs 131 forming the stacked side laminations 127. Each of the bobbin wound electrical coils 147 are illustrated as being generally rectangular in shape corresponding to the generally rectangular shaped stacked side legs 131 of the stacked side laminations 127.

After each insulating bobbin with wound electrically conductive coil 147 is mounted on each of the stacked side legs 131 to produce three spaced pairs of coils 147, 147 circumferentially arranged around the six pole central portion 129, a second stack of laminations 149, formed by a corresponding number of separate magnetically conductive stacked laminations, is attached to the outer free extremities of each spaced pair of stacked side legs 131,131, as best illustrated in FIGS. 17–19 and 21–22 of the drawings. Each of the second stack of laminations 149 constitute a second or separate end leg. Thus, the first stack of laminations 127 have a six pole central portion 129 with three spaced pairs of side legs 131, 131, as illustrated, while the separate magnetically conductive stacked laminations forming the second stack of laminations 149, provide a separate end leg for attachment to the outer free extremities of each pair of stacked side legs 131, 131, through complementary male and female fastening elements, as in the previous embodiments. This completes the flux path or magnetic conductor circuit for the six pole shaded pole motor 125.

Figures 21, 22:
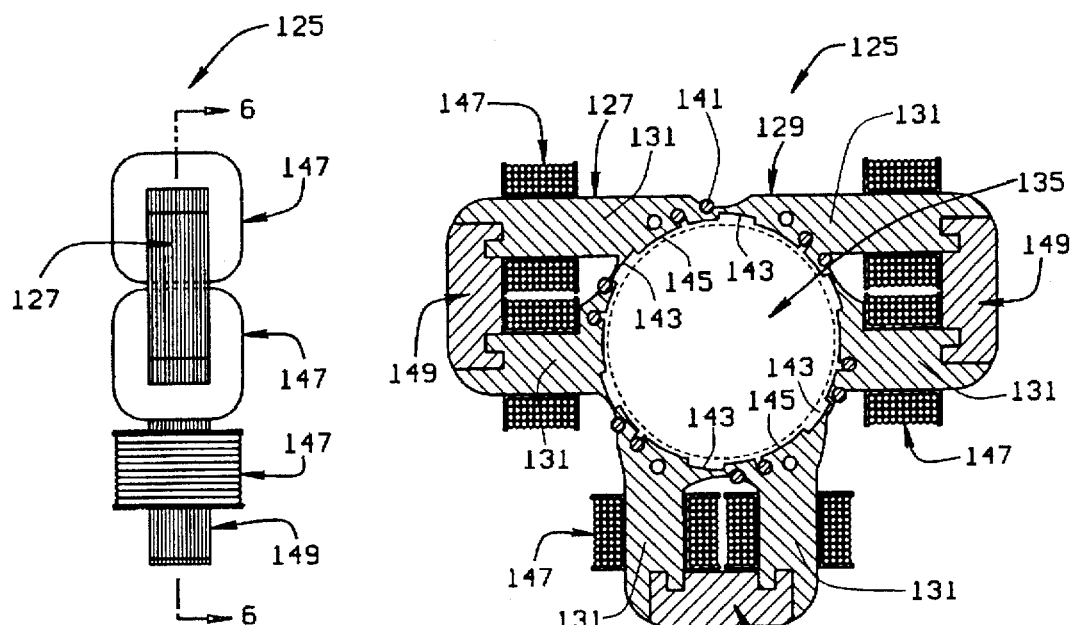
FIG. 21 is an end elevational view of the six pole shaded pole motor shown in FIG. 17.
FIG. 22 is a sectional view of the six pole shaded pole motor illustrated in FIG. 17 as viewed along lines 22—22 of FIG. 21.

As best illustrated in FIGS. 18 and 22 of the drawings, it will be noted that when each of the bobbin wound coils 147 are mounted on each of the stacked side legs 131, each electrically conductive coil 147 is mounted in close proximity to one motor pole 143 and the aligned rotor opening 133 in the first stack of laminations 127 and the rotor 135. Each electrically conductive coil 147 may be formed with less electrically conductive wire than a single electrically conductive coil in an equivalent magnetically conductor circuit. The use of less material on each electrically conductive coil 147 mounted on the stacked side legs 131, as compared to the length of a single electrically conductive coil on a conventional six pole motor of endless shape, is due to the longer length and smaller mean diameter of the electrically conductive coils 147 positioned on each pair of spaced side legs 131, 131. Additionally, the electrically conductive wire forming each electrically conductive coil 147 may also have a smaller diameter. Reduction in diameter of the electrically conductive wire forming each electrically conductive coil 147 is believed due to the shorter wire length of each electrically conductive coil 147 and the greater winding surface area of each electrically conductive coil 147.

With the six pole shaded pole motor 125 construction of the present invention, it is believed that there will not only be a substantial savings in the wire used in the electrically conductive coils 147, but also in the lamination material used for the side and end laminations 127, 149, as compared to other six pole motors of circular or other endless shaped construction. Furthermore, greater overall efficiency may be possible, in spite of the substantial reduction in the amount of material required for the electrically conductive coils 147 and the savings in lamination material for the side and end laminations 127 and 149, due to the unique construction of the six pole shaded pole motor 125 and its operation.

Figure 23:
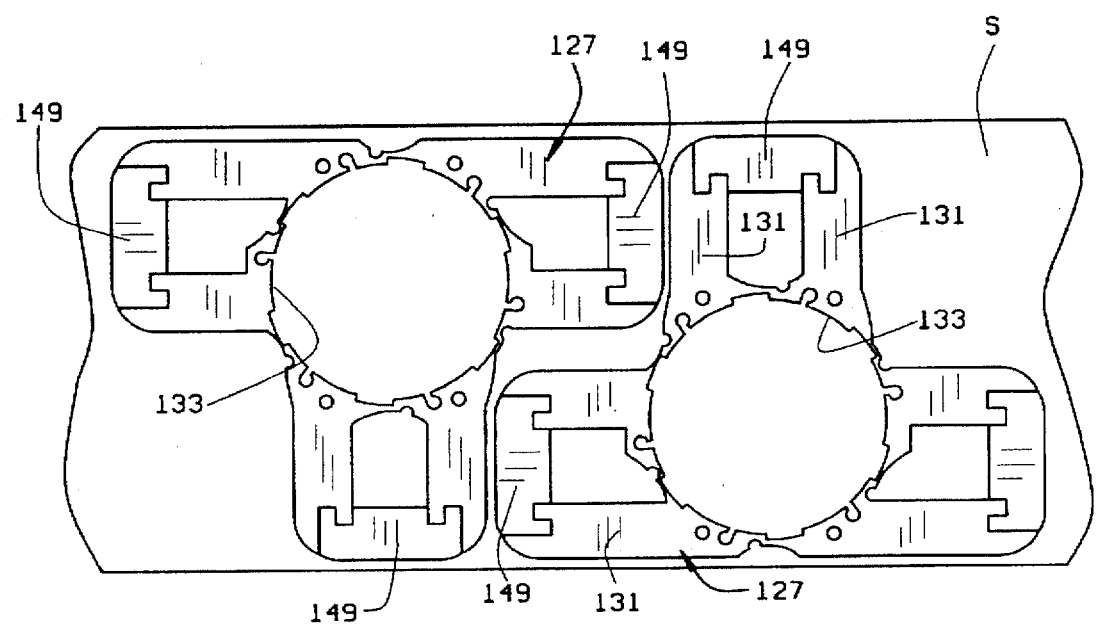
FIG. 23 is a die layout view illustrating a method of manufacturing laminations used in the six pole shaded pole motor shown in FIGS. 17–22 of the drawings.

The related method of forming the side and end laminations 127 and 149 from an elongated strip S of magnetically conductive material is best illustrated in FIG. 23 of the drawings. As illustrated in FIG. 23, adjacent pairs of side laminations 127, 127 are formed with one spaced pair of side legs 131, 131 in generally overlapping relationship with one another, as illustrated. At the same time, adjacent side laminations 127, 127 also have one adjacent pair of spaced legs 131, 131 from each side lamination 127 extending generally transverse to another pair of spaced side legs 131, 131 of the adjacent side lamination 127, as illustrated. This provides the overlapped and interfitting arrangement illustrated in FIG. 23 of the drawings, maximizing scrap efficiency and economy of manufacture. It will also be noted that the end laminations 149 are formed in precisely the location that they would be attached to the outer free extremities of the spaced side legs 131, 131, also maximizing scrap efficiency and economy of manufacture. Of course, the end laminations 149 may be formed with tabs or recesses to engage complementary fastening elements at the other end of the spaced side legs 131, 131 as in the previous embodiments, if desired. With such constructions, the end laminations 149 may be longitudinally formed in the space between the spaced side legs 131, 131, if desired. Although the rotor laminations forming the rotor 135 are not illustrated in FIG. 23 of the drawings, it will be understood that the rotor laminations 135 will be stamped from the rotor openings 133 in a conventional manner.

The six pole shaded pole motor 125 operates similar to other shaded pole motors with alternate poles and shading coils to produce rotational torque.

Figure 46:
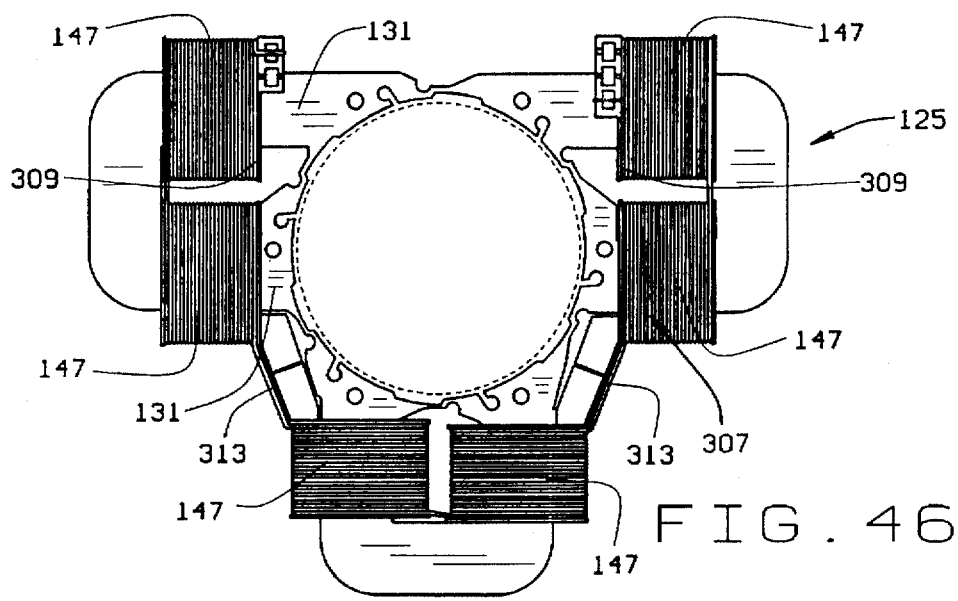
FIG. 46 is a side elevational view of a six pole shaded pole motor of the type illustrated in FIGS. 24–26 with the bobbin construction shown in FIG. 47 mounted upon three pairs of adjacent and spaced side legs circumferentially spaced about a central portion, as illustrated.

Reference is now made to the modified form of six pole shaded pole motor 155 illustrated in FIGS. 24–26 of the drawings. The six pole shaded pole motor 155 has the general overall construction of the six pole shaded pole motor 125 shown in FIGS. 17–23 of the drawings, and therefore, corresponding reference numerals have been used to designate like parts. The only difference in the six pole shaded pole motor illustrated in FIGS. 24–25 of the drawings is in the U-shape of the end laminations 157, the shorter length of the side legs 131 and the corresponding male tabs 159 at the outer free extremities of the legs 131 that are received within complementary shaped recesses 161 in the end laminations 157. As depicted, the complementary male and female fastening tabs/recesses 159, 161 are similar to those illustrated in the FIGS. 1–9 and 10–15 embodiments. For the end laminations 157, it will be noted that they have a U-shape with spaced legs 163, 163 that are provided with the recesses 161, 161 for receiving the male tabs 159, 159 at the outer ends of each pair of the shortened legs 131, 131. Such a construction may be used to facilitate the mounting of adjacent interconnected coils 147 on the legs 131, as shown in FIG. 46 below.

Thus, the end laminations in this and other embodiments may have a rectangular shape as illustrated in the previous embodiments or a U-shape as illustrated in this embodiment.

The end laminations 157 may be formed from an elongated strip of electrically conductive material S in the same manner illustrated in FIG. 23 of the drawings. More specifically, as illustrated in the die layout view of FIG. 26 of the drawings where each U-shaped lamination 157 is shown with its spaced legs 163, 163 in line with one spaced pair of side legs 131, 131 of a side lamination 127, it will be seen that adjacent side laminations 127, each having three spaced end laminations 157, are formed in overlapped and interfitting relationship to one another. Thus, two adjacent end laminations 157, each having legs 163, 163 for connection to associated side legs 131, 131 of one side lamination 127, are in overlapped relationship to one another, while at the same time, being in transverse relationship to another end lamination 157 with legs 163, 163 that are attached to the side legs 131, 131 of a side lamination 127, as illustrated. This produces a cost efficient, scrap conserved method of producing the side and end laminations 127, 157, while rotor laminations can be formed prior to or at the same time other laminations are formed.

The six pole switched reluctance motor illustrated in FIG. 27 of the drawings and its related method illustrated in FIG. 28 is generally similar to the construction of the six pole shaded pole motor illustrated in FIGS. 17–23 of the drawings. In this regard, note that each of the side laminations 167 are provided with a six pole central portion 169 with three spaced pairs of side legs 171 circumferentially spaced about the six pole central portion 169. The three spaced pairs of side legs 171, 171 are circumferentially spaced around the six pole central portion 179 in generally the same manner as illustrated in the six pole shaded pole motor 125 shown in FIG. 20 of the drawings. Specifically, two spaced pairs of side legs 171,171 and 171,171 on opposite sides of the six pole central portion 169 are in mirror image relationship to one another, while the third pair of spaced side legs 171, 171 extends generally transverse to the other two spaced pairs of side legs 171,171 and 171,171.

Bobbin wound electrical coils 173 are positioned over each of the stacked side legs 171 of the stacked side laminations 167, and separately stacked end laminations 175 are attached, through complementary male and female fastening tabs/recesses, to the outer free extremity of each adjacent pair of spaced side legs 171,171, as in the previous embodiments.

What is different with the six pole switched reluctance motor 165 illustrated in FIGS. 27–28 of the drawings is the shape of the rotor opening 177 which has six circumferentially spaced poles 179 that are circumferentially spaced from adjacent poles by reluctance gaps or thinned areas 181. It will be noted that adjacent reluctance gaps or thinned areas 181 have a different circumferential extent around the rotor opening 177, and thus the six poles 179 are three equally spaced pairs of pole faces 143 spaced around the circumferential rotor opening 177. The rotor 183 is formed with five generally equally spaced and outwardly directed poles 185. Thus, only some of the poles 185 of the rotor 183 are, at any one time, in alignment with the poles 179 around the rotor opening 177. In FIG. 27 of the drawings, two of the adjacent poles 185, 185 of the rotor 183 are shown as being in alignment with two of the adjacent poles 179, 179 around the rotor opening 177.

The six pole switched reluctance motor 165 operates in the following manner. Each pair of adjacent windings 173, 173 is connected so that when a current is applied, an electric magnet is created with a north and south pole. Each pair of windings is energized in sequence to rotate the rotor 183. For example, for clockwise rotation, assume the upper right set of coils 173, 173 in FIG. 27 has just been energized to pull the two rotor teeth into alignment with the two stator pole teeth. Current would then be removed from the upper right set of coils and applied to the pair of upper left hand coils, which would pull the two left hand rotor teeth 185 into alignment with the two left hand stator pole teeth 179. This would have also moved the two lower right quadrant rotor teeth 185 to positions adjacent to the two lower stator pole teeth 179. Next, the current would be switched from the upper left coils 173 to the lower coils 173 to pull the now adjacent rotor teeth 185 into alignment with the lower stator poles 179. This switching sequence would be continued to provide continuous rotation. Coil pairs 173, 173 could be a single coil 173 positioned on any one of the three sides of the U-shaped configurations.

Reference to FIG. 28 of the drawings shows the related method of making the side laminations 167, the end laminations 175 and the rotor laminations 183 which are used in the switched reluctance motor 165. The related method of FIG. 28 is similar to the related method in the six pole shaded pole motor method illustrated and described in connection with FIG. 23 of the drawings. As shown, adjacent side laminations 167 have one adjacent pair of spaced legs 171, 171 in generally overlapped relationship with one spaced pair of side legs 171,171 of an adjacent side lamination 167, while the overlapped spaced pairs of side legs 171,171 and 171,171 of adjacent side laminations 167 also extend generally transverse to another pair of spaced side legs 171,171 of the adjacent side lamination 167, in the same manner as described and illustrated in connection with FIG. 23 of the drawings. As will be appreciated, this maximizes scrap efficiency while producing economy in the continuous manufacture of such various side, end and rotor laminations.

An eight pole shaded pole motor 195 and its related method of manufacture are illustrated in FIGS. 29-34 of the drawings. First of all, it will be seen that the generally overall construction of the eight pole motor illustrated in FIGS. 29-34 of the drawings is similar to the general construction of the four pole permanent split capacitor motor 55 illustrated in FIGS. 9-15 of the drawings. There are some specific differences which will become apparent in comparing the two motor constructions.

Figure 29:
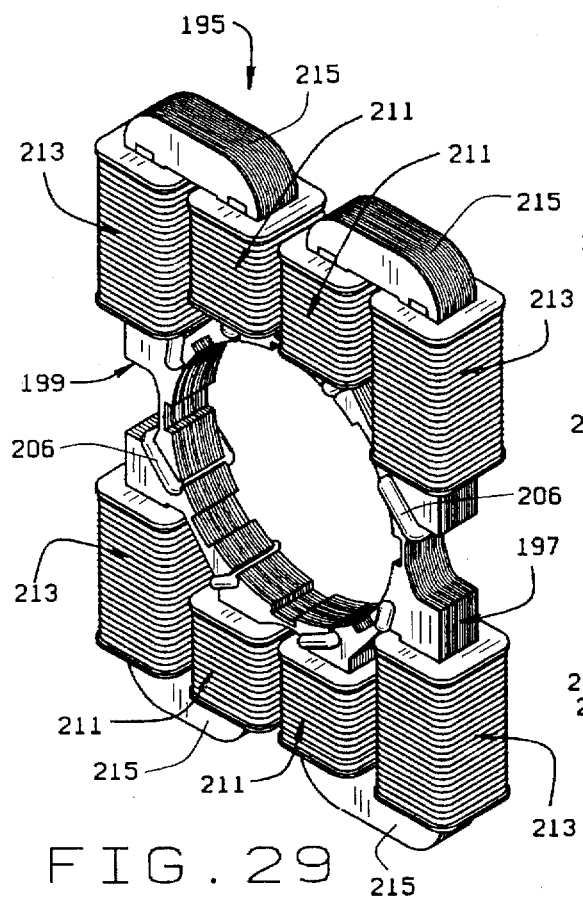
FIG. 29 is a perspective view of an eight pole shaded pole motor constructed in accordance with the teachings of the present invention.
Figure 30:
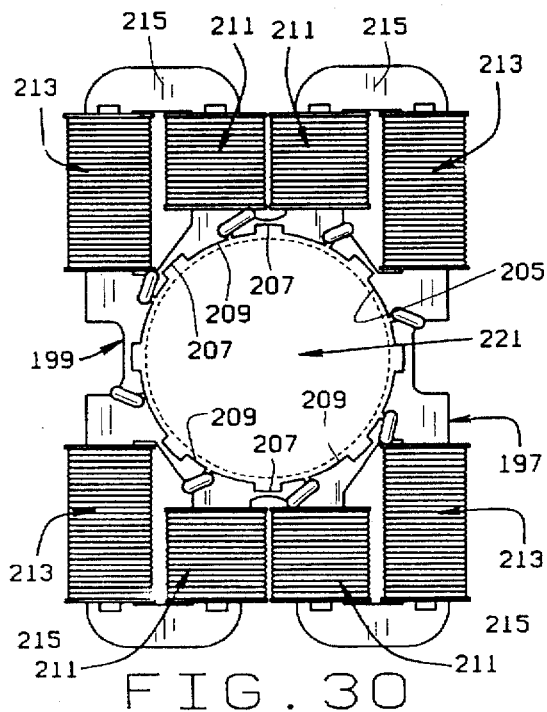
FIG. 30 is a side elevational view of the eight pole shaded pole motor shown in FIG. 29.
Figure 31:
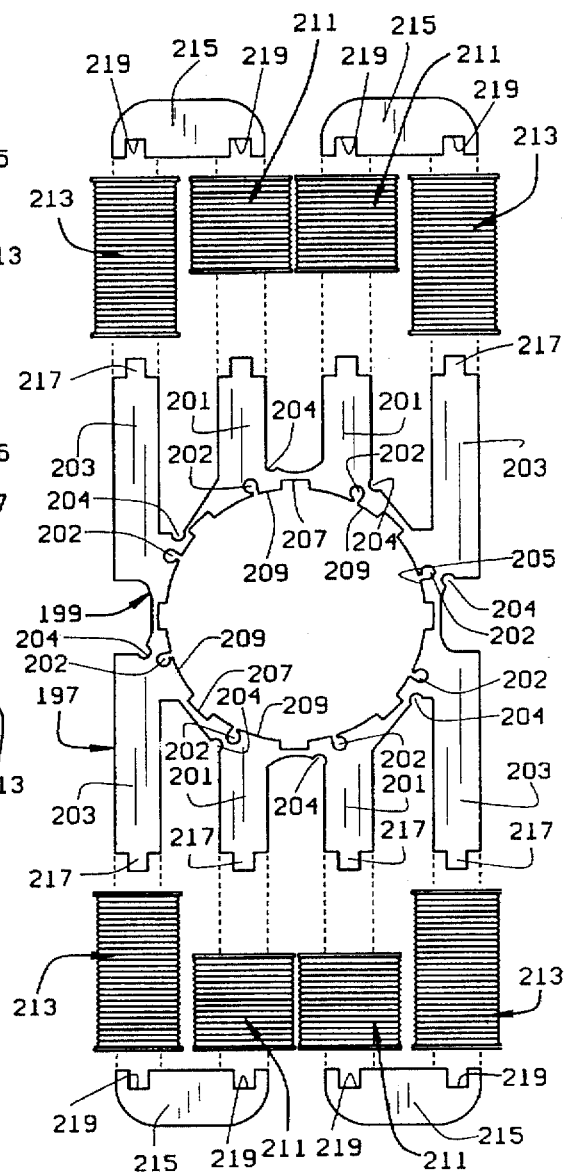
FIG. 31 is an exploded side elevational view of the laminations and coil used in the eight pole shaded pole motor shown in FIG. 29 of the drawings.
Figure 32:
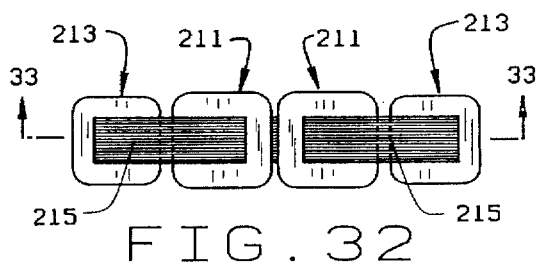
FIG. 32 is a top plan view of the eight pole shaded pole motor illustrated in FIG. 29.

One of the similarities of the two motors is in the shape of the first stack of side laminations 57 in the four pole permanent split capacitor motor 55 illustrated in FIGS. 9-15 and the side laminations 197 illustrated in FIGS. 29-34 of the drawings. Specifically, in FIGS. 29-34 of the drawings, the side laminations 157 include two spaced pairs of side legs on each side of an eight pole central portion 199. This includes two spaced pairs of innermost side legs 201, 201 and a spaced pair of outermost side legs 203, 203 on opposite sides of the eight pole central portion 199. As best seen in FIG. 31 of the drawings, each of the innermost side legs 201 are in mirror image relationship to an adjacent innermost side leg 201, when viewed horizontally, while also being in mirror image relationship to an innermost side leg 201 on an opposite side of the eight pole central portion 199, when viewed in a vertical direction. The same is true of the outermost legs 203 on each side and on opposite sides of the eight pole central portion 199. The eight pole central portion 199 has a rotor opening 205 with gaps producing thinned areas or reluctance gaps 207 that separate adjacent poles 209 from each other. As illustrated, the multi-pole central portion 199 has eight poles 209 generally spaced equidistantly around the rotor opening 205.

The eight pole motor 195 is of the shaded pole motor type which includes shading coils to produce starting torque and rotation of the rotor 221. In this regard, each of the stacked side laminations are provided with eight pairs of inner and outer cooperating openings 202, 204 for receiving shading coils 206, as best seen in FIGS. 29-31. Each of the shading coils 206 are formed by a loop of copper or other electrical conductor which is arranged to encircle one of the eight poles 209 of the eight pole motor 195, as in the previous six pole shaded pole motor 125 of FIG. 17-23.

Each of the spaced innermost legs 201, 201 receive electrically conductive coils 211, 211 on each side of the eight pole central portion 199, while the two outermost legs receive electrically conductive coils 213, 213. As in the FIGS. 9-15 embodiment, the two innermost coils 211, 211 have a length shorter than the two outermost coils 213, 213, due to the difference in length between the two innermost legs 201, 201 and the two outermost legs 203, 203. However, the coils 211, 213 may have the same length as shown, for example, in the modified coil arrangement illustrated in FIG. 9 of the drawings.

Once the coils 211, 211 and 213, 213 are placed on the spaced innermost legs 201, 201 and spaced outermost legs 203, 203 on opposite sides of the eight pole central portion 199, a second stack of end laminations 215, formed by a corresponding number of separate magnetically conductive stacked laminations, is attached to the outer free extremities of each pair of adjacent innermost and outermost legs 201, 203 on each side and on opposite sides of the eight pole central portion 199. For attaching adjacent innermost and outermost legs 201, 203, respectively, to the second stack of laminations 215, it will be seen that the outer free extremities of each of the innermost and outermost legs 201, 203 are provided with outwardly extending male tabs 217 for complementary reception within a correspondingly shaped aligned recess or opening 219 formed in each of the second stack of laminations 215. A rotor 221 is received within the rotor opening 205 in order to complete the eight pole motor construction.

With the eight pole motor constructed in a manner illustrated in FIGS. 29-33 of the drawings, the operation of same will be similar to other shaded pole motors with alternate poles and shading coils to produce rotational torque, as is well known.

Figures 33, 34:
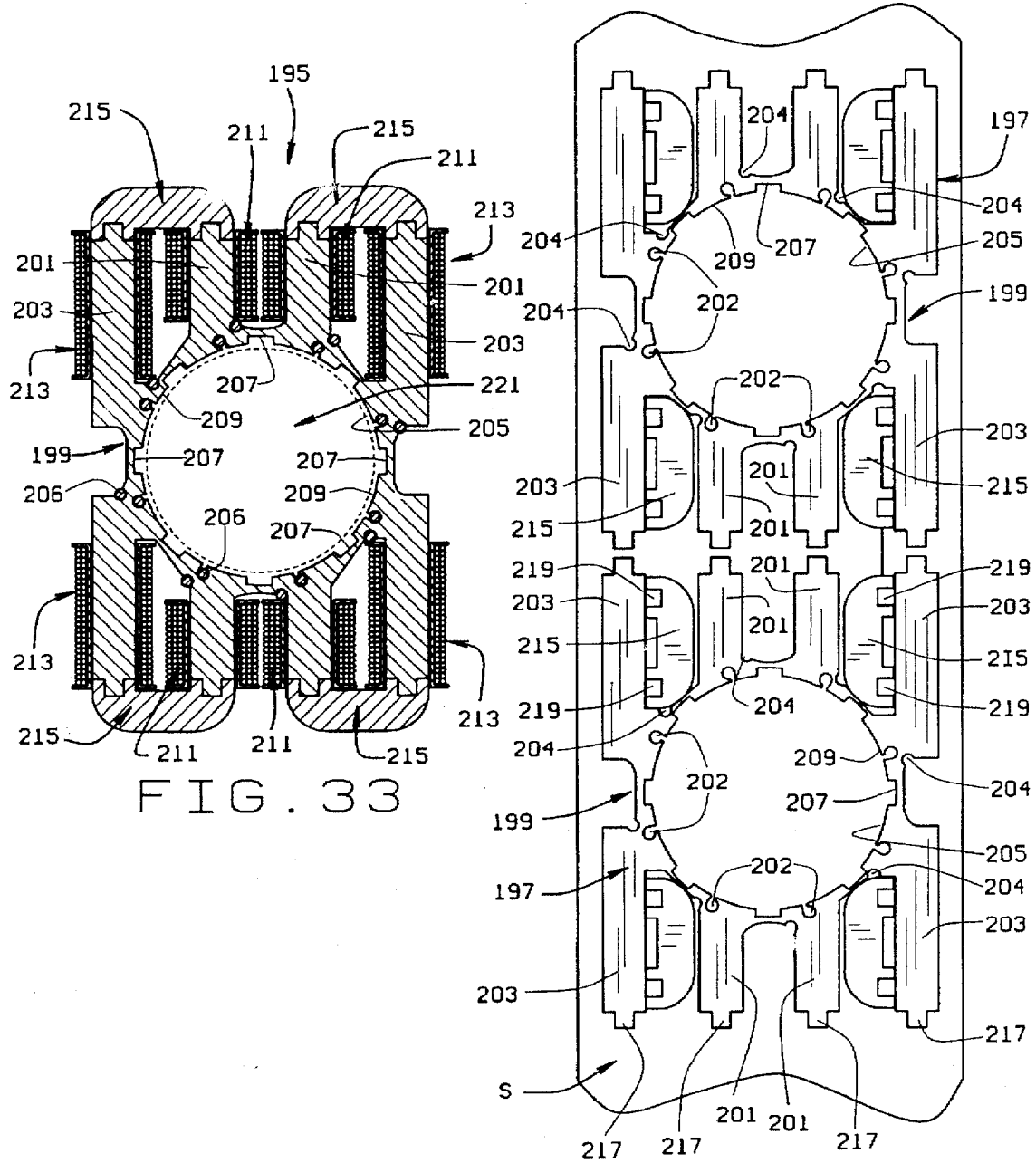
FIG. 33 is a sectional view of the eight pole shaded pole motor as viewed along lines 33—33 of FIG. 32.
FIG. 34 is a die layout view illustrating a method of manufacturing laminations used in the eight pole shaded pole motor illustrated in FIGS. 29–33 of the drawings.

For the related method of manufacturing side and end laminations 197 and 215 of the eight pole motor 195 illustrated in FIGS. 29-33 of the drawings, reference is made to FIG. 34 which shows a die layout for the manufacture of such side and end laminations from an elongated strip S of magnetically conductive material. The method of FIGS. 34 is somewhat similar to the method described in connection with the four pole permanent split capacitor side and end laminations shown in FIG. 15 of the drawings in the sense that two adjacent side laminations 197, 197 are arranged in sequential relationship to one another. The end laminations 215 are formed in the spaces between adjacent innermost and outermost legs 201, 203 in each of the side laminations 197, as illustrated. This repeating die layout pattern facilitates the stamping of adjacent side and end laminations 197, 215 in economical and scrap efficient manner, as has been discussed above. Rotor laminations 221 will be formed from the rotor openings 205 also in a similar manner.

FIGS. 35–36 of the drawings illustrate a modified four pole shaded pole motor construction somewhat different than that disclosed in my co-pending patent application entitled TWIN BOBBIN FOUR POLE MOTORS AND METHODS FOR MAKING SAME bearing Ser. No. 08/381,188 filed on Jan. 31, 1995, now U.S. Pat. No. 5,627,424. As illustrated, the four pole motor 225 includes a stacked series of magnetically conductive side laminations 227 each having a four pole central portion 229. A rotor opening 231 within the four pole central portion 229 receives a rotor 233. Extending from each side of the four pole central portion 229 are three spaced and opposed legs including a spaced pair of outermost legs 235, 235 and a single innermost leg 237. The single innermost leg 237 has approximately twice the width of each of the two outermost legs 235, 235.

Each of the innermost legs 237, 237, on opposite sides of the four pole central portion 229, are proximate a north pole 239 while the spaced outermost legs 235, 235 are proximate a south pole 241. As illustrated in FIG. 36, each of the outermost legs 235 share a south pole 241 with an outermost leg 235 in mirror image relationship with it on an opposite side of the four pole central portion 229. Shading coil slots 243 are provided in the four pole central portion 229 adjacent certain of the legs 235, 237 for receiving the shading coils 245, as illustrated in FIG. 35 of the drawings.

Bobbin coils 247 are positioned over each of the innermost legs 237 only. Finally, end laminations 249 are attached to the outer extremities of the legs 235, 235 and 237 on each side of the four pole central portion 229, through suitable complementary fastening elements, as in the previous embodiments.

The four pole motor 225 constructed as described above operates in the following manner. The two coils 247 are connected to make poles 239 of the same polarity. This forces or makes the two poles 241 induced in the opposite polarity. The motor 225 then operates like a conventional four pole shaded pole motor with alternate north and south poles and shading coils to provide rotational torque.

FIGS. 37 and 38 disclose two pole and four pole switched reluctance motor constructions. Both of these motors have the same general construction as the twin bobbin C-frame motor disclosed in my co-pending patent application entitled TWIN BOBBIN C-FRAME MOTORS AND METHODS FOR MAKING SAME bearing Ser. No. 08/381,187 filed Jan. 31, 1995, now U.S. Pat. No. 5,619,086. It will be appreciated that the twin bobbin C-frame motors as disclosed in my aforementioned patent application were shaded pole motors, while the two pole and four pole switched reluctance motors shown in FIGS. 37 and 318, respectively, have a different construction in the rotor opening and in the rotor, as will become apparent.

The two pole switched reluctance motor 255 shown in FIG. 37 includes stacked magnetically conductive side laminations 257 including spaced side legs 259, 259 for receiving spaced bobbin coils 261, 261. Stacked end laminations 263 are attached to the outer free extremities of the spaced side legs 259, 259, also through complementary fastening connections, as in the previous embodiments. The thus formed and assembled stacked and end laminations 257, 263 form the stator for the two pole switched reluctance motor 255. The rotor opening 265 provided in the stacked laminations 257 includes spaced poles 267, 267. An I-bar shaped rotor 269, with rounded ends forming the spaced poles 271, 271, is received within the rotor opening 265 and rotates relative to the spaced poles 267, 267.

Variable or switched reluctance motors of the prior art typically employ a stator containing magnets and a rotor made of laminated magnetic conductive material such as steel.

In the case of the two pole switched reluctance motor 255 shown in FIG. 37, the spaced coils 261,261 are in the magnetic circuit flux path with the spaced poles 267, 267 in the rotor opening 265 of the side laminations 257 and serve as the stator poles. The rotor 269 has the spaced poles 271, 271 that are rotated by the flux in the magnetic inductor circuit of the stator in either a clockwise or counterclockwise direction, as determined by the position of permanent magnets M mounted on one or both sides of the stator or stacked side laminations 257 between the spaced poles 267, 267.

The two pole switched reluctance motor 255 of FIG. 37 is a unidirectional two pole motor and uses at least one permanent magnet M to provide the correct starting position of the rotor 269. Specifically, in FIG. 37, two permanent magnets M, M align the rotor 269 approximately as shown when the motor 255 is unenergized, such that when current is applied to the coils 261, the rotor 269 is pulled in a clockwise direction. Sufficient current must be applied so that when the current is switched off, approximately when the leading edge of the rotor 269 is aligned with the center of the right pole face 267, the rotor 269 and its load will have enough inertia to continue rotating at least about until the leading edge of the rotor 269 is aligned with the lower corner of the left pole face 267 at which time the coils 261 are again switched on. This timed switching sequence continues for continued rotation. The two coils 261,261 could be one coil mounted on either leg 259 or on the end lamination 263, if desired.

The four pole switched reluctance motor 275 shown in FIG. 38 of the drawings has the same construction for the side laminations 257, the bobbin coils 261 and end laminations 263 used in the two pole switch reluctance motor 255 of FIG. 37, and therefore, corresponding reference numerals have been used to designate like parts in both motors. Within the rotor opening 277 of the side laminations 257, there are four spaced poles 279 which provide cooperative flux interaction with the four spaced poles 281 of the steel rotor 283.

The motor of FIG. 38 is a two pole unidirectional motor with two teeth per pole and at least one permanent magnet M to provide the correct starting position of the rotor 283. It operates similarly to the motor of FIG. 37 with the leading edges of the rotor 283 aligned with the edges of the stator pole teeth 279 at start. Current is switched on through the coils 261 to pull the leading edges of the rotor teeth 281 to the center of the stator teeth 279 at which time the current is switched off and the leading edge of the rotor 283 is allowed to coast to the edges of the next stator teeth 279 when the current is again switched on. The rotor of FIGS. 37 rotates one-half revolution per current pulse, while the rotor of FIG. 38 rotates one-fourth revolution per current pulse.

The simplified construction of the two pole and four pole switched reluctance motor shown in FIGS. 37 and 38, as well as other multi-pole switched reluctance motors of similar configuration, provides particular usefulness in direct drive application without the need for gear trains. These simplified motors can be made manually reversible by sliding the magnets M to the other side of the slots between the poles, through a magnet mounted yoke construction or the like.

Figure 39:
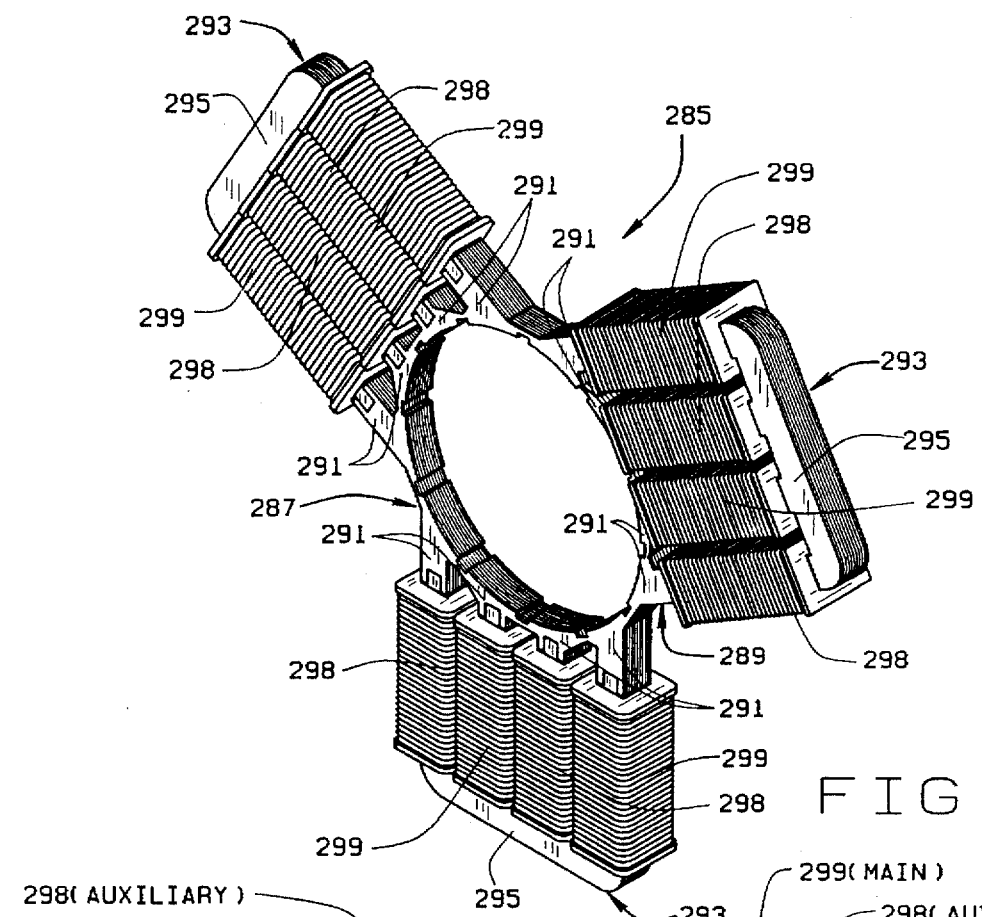
FIG. 39 is a perspective view of a six pole permanent split capacitor motor constructed in accordance with the teachings of the present invention.
Figure 40:
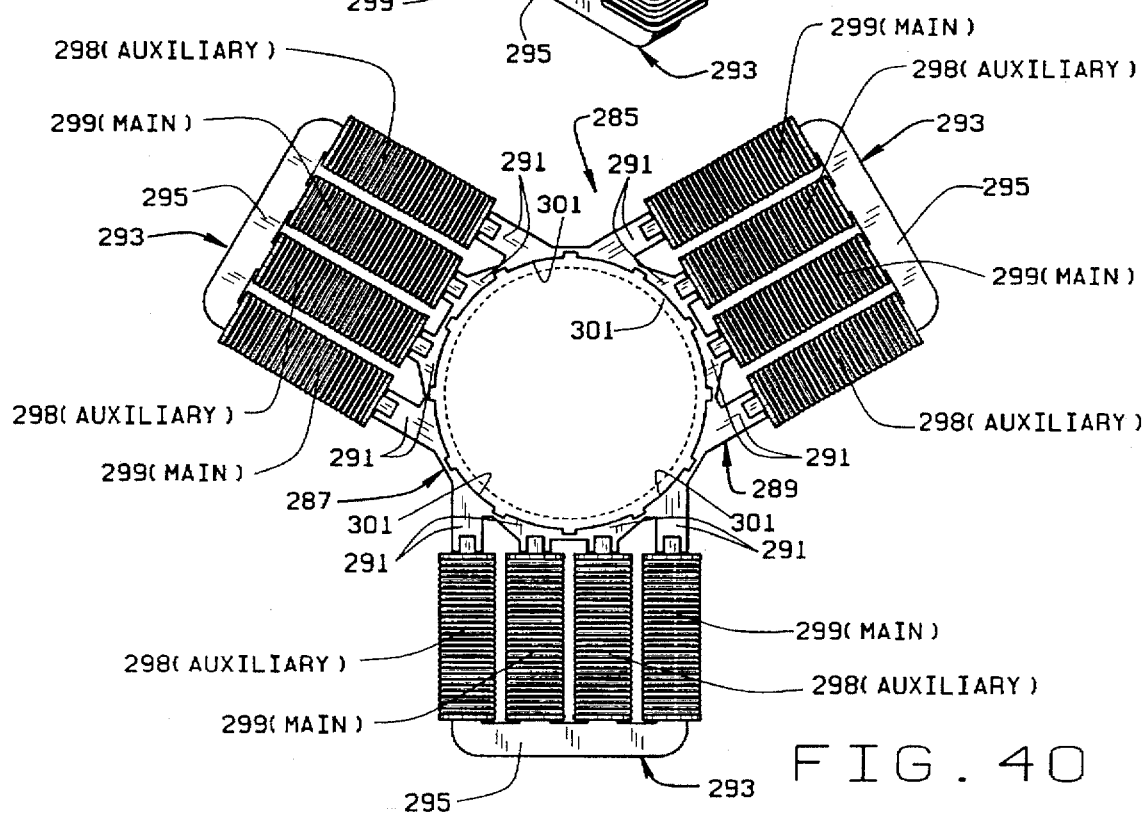
FIG. 40 is a side elevational view of the six pole permanent split capacitor motor shown in FIG. 39.
Figure 41:
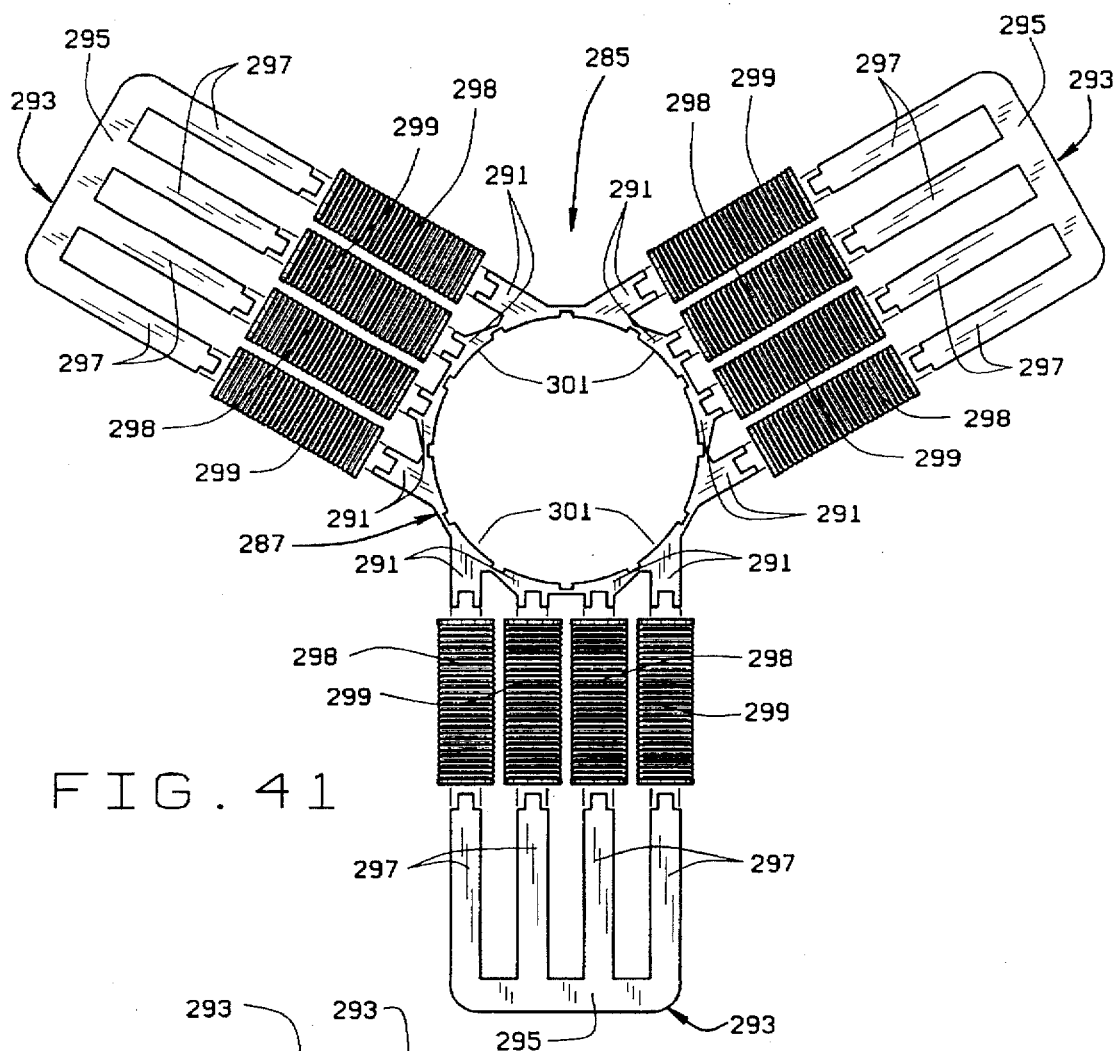
FIG. 41 is an exploded side elevational view of the six pole permanent split capacitor motor shown in FIG. 39.
Figure 42:
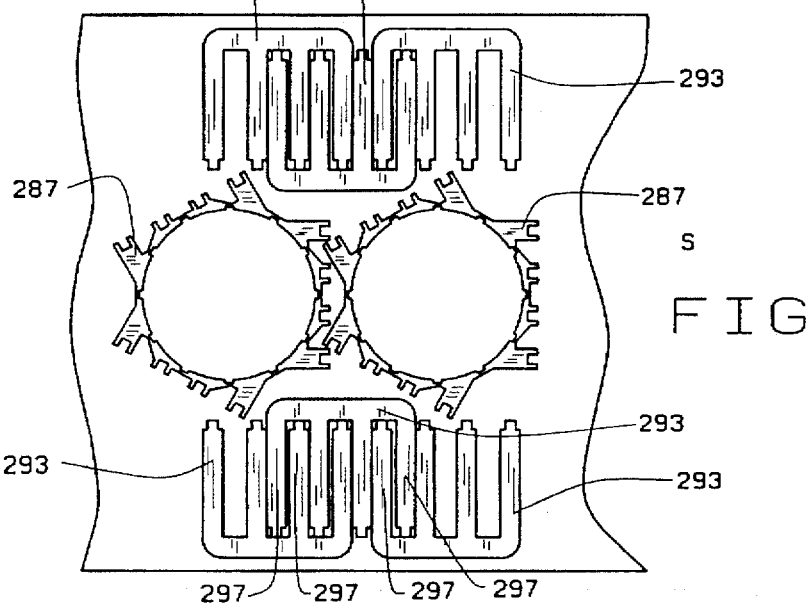
FIG. 42 is a die layout showing one method of manufacturing laminations used in the six pole permanent split capacitor motor illustrated in FIG. 39.

One type of six pole permanent split capacitor motor 285 is shown in FIGS. 39–41 with its related method of manufacture shown in FIG. 42. As will become apparent, the six pole permanent split capacitor motor 285 has some features similar to the six pole shaded pole motor 125 of FIG. 17–25 of the drawings, as well as the four pole permanent split capacitor motor 55 of FIGS. 9–15.

Specifically, the six pole permanent split capacitor motor 285 includes a first stack of laminations 287 formed from a series of magnetically conductive stacked laminations, each having a six pole central portion 289 with three circumferentially spaced groups of four shortened side legs 291 in each circumferentially spaced group. As illustrated in FIGS. 39–41, each of the three circumferentially spaced groups of four shortened side legs 291 are equally circumferentially spaced from one another, although other embodiments are possible, such as the T-shaped six-pole motor construction shown in FIGS. 17–28 or the other construction shown and described below in connection with FIGS. 43–45.

For cooperation with each circumferentially spaced group of four shortened side legs 291, the end laminations 293 are provided with a transverse end section 295 and four depending legs 297 corresponding in spacing to a group of four shortened side legs 291. At the end of each of the four depending legs 297, there are male tabs for receipt within corresponding shaped recesses at the ends of the four shortened legs 291, in order to provide mating interlocked engagement, as in previous embodiments.

Prior to attachment of the four depending legs 297 to a group of four shortened legs 291, electrically conductive auxiliary coils 298 and main coils 299 are mounted over each of the legs 297, as illustrated in FIG. 39–41. Thereafter, each end lamination 293, with four coils (alternating auxiliary coils 298 and main coil 299) mounted thereon, are attached through the four depending legs 297 to one group of four shortened legs around the six pole central portion 289, as illustrated.

As best illustrated in FIG. 40, when the alternating auxiliary coils 298 and main coils 298 or 299 are mounted around the six pole central portion 289, each of the coils 298 or 299 are mounted in close proximity to an adjacent pole face or shared half-pole 301. The aligned rotor openings 303 in the side laminations 287 receive a rotor 305 that is driven by flux generated through the aforementioned coils 298 or 299 and shared half-poles 301 of the motor 285, in a manner to be described below. In this regard, although the six pole permanent split capacitor motor 285 has three circumferentially spaced groups of coils 299 extending about a central portion 289 similar to the six pole shaded pole motor 125 of FIGS. 17–25, each of the four coils (alternating auxiliary coils 298 and main coils 299) in the three circumferentially spaced groups is similar to the coils on one side of the central portion in the four pole permanent split capacitor motor illustrated in FIG. 9.

Operation of the six pole permanent split capacitor motor 285 is described below in connection with FIGS. 39–41 of the drawings. Consider the three spaced stator sections of FIG. 40 to be three separate two pole motors operating on the three corresponding sections of the rotor separately. Then, it can be seen that the two main winding coils 299 are displaced 30 mechanical or 90 electrical degrees from the two auxiliary winding coils 298 in each of the three two pole stator sections operating on the rotor. Since a capacitor connected in series with all the auxiliary windings 298 causes the current in all the auxiliary coils 298 to lead the current in all the main windings 299, the stator winding reaches a maximum along the electrical axes of the auxiliary windings 298 first and then somewhat later in time reaches a maximum along the electrical axes of the main windings 299. The auxiliary and main winding currents are equivalent to 2-phase currents, and the motor 285 is equivalent to a two phase motor. The result is a rotating stator field that causes the rotor 302 to turn.

The related method of manufacturing the side laminations 287 and the end laminations 293 in the six pole permanent split capacitor motor 295 of FIGS. 39–41 is illustrated in FIG. 42 of the drawings. There, it will be seen that the side laminations 287 are formed in a central portion of the magnetically conductive strip S while the end laminations 293 are formed from opposite end areas of the elongated strip S. Specifically, the side laminations 287 are formed in close fitting adjacent and somewhat nested relationship, as illustrated, while the depending legs 297 of adjacent end laminations are shown in nested and overlapped relationship with respect to one another, to facilitate material conservation.

Another type of six pole permanent split capacitor motor 305 is illustrated in FIGS. 43–44 of the drawings with a related method of manufacturing the laminations used in such motor being illustrated in FIG. 45 of the drawings. The six pole permanent split capacitor motor 305 differs from the six pole permanent split capacitor motor 285 shown in FIGS. 39–41 by different side and end lamination constructions. Specifically, the side laminations 307 have a rotor opening 309 with three groups of four legs 311 in each of the three groups. The two inner legs 311 in each group are similar to the two inner legs 291 in the side laminations 287 of the motor 285 in FIGS. 39–41, while the two outer legs 311 in each group have a different construction than the two outer legs 291 in each group of the motor 285. Specifically, the two outer legs 311 in each group have an L-shaped construction which extends from the rotor opening 309 in a direction transverse to and then in the same direction as the two inner legs 311. This L-shaped construction for the two outer legs 311 in each group of four legs enables the three groups of four legs to be spaced closer to one another than the legs 291 in the motor 285 of FIGS. 39–41. Also, this modified leg construction of the FIGS. 43–44 embodiment saves scrap in the manufacture of such side and end laminations, as explained in connection with FIG. 45 below.

Note further that the end laminations 313 are each provided with a transverse end section 315 and four shortened depending legs 317, each of which are spaced a greater distance laterally apart from one another than the legs 297 of the end laminations 293 in the FIGS. 39–41 embodiment. By having each of the shortened legs 317 spaced laterally further from one another in the end laminations 313 of the FIGS. 43–44 embodiment, larger winding windows are provided enabling more windings to be wound around the shortened legs 317, thus also providing a shorter magnetic path. As will be appreciated, a shorter magnetic path may also result in a greater operating efficiency and/or power factor improvement.

FIG. 45 shows the related method of making the side and end laminations 307 and end laminations 313 used in the six pole permanent split capacitor motor 305 illustrated in FIGS. 43–44 of the drawings. As illustrated, adjacent side laminations are positioned in somewhat nested relationship in the central portion of the magnetically conductive strip S; however, in this instance, one of the end laminations 313 can be formed with the depending legs 317 in aligned relationship with the shortened side legs 311 on alternate opposite ends of adjacent side laminations 307, as illustrated. The other two end laminations 313 used in forming each motor 305 are shown as being formed with the depending legs 317 in overlapped and nested relationship, as illustrated. The side laminations 307 and end laminations 313 so constructed and arranged provides substantial savings in material over the method described in connection with FIG. 42 of the drawings, as will be appreciated.

The operation of the six pole permanent split capacitor motor 305 is similar to that described in connection with the motor 285, and thus further explanation is unnecessary.

Although the constructions of the side and end laminations 307, 313, respectively, are described in connection with the six pole permanent split capacitor motor 305, it will be understood that the side and end laminations 307, 313 could also be used in connection with other types of motors, such as shaded pole motors, switched reluctance motors or other motor applications, as may be desired.

Figure 47:
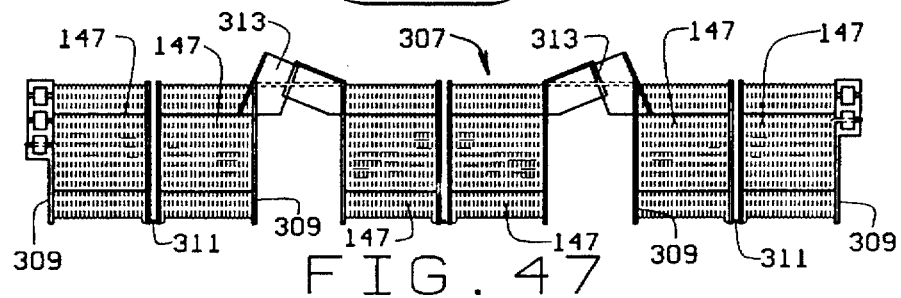
FIG. 47 is a side elevational view of a bobbin construction for six pole shaded pole motors of the type shown in FIG. 46.
Figure 48:
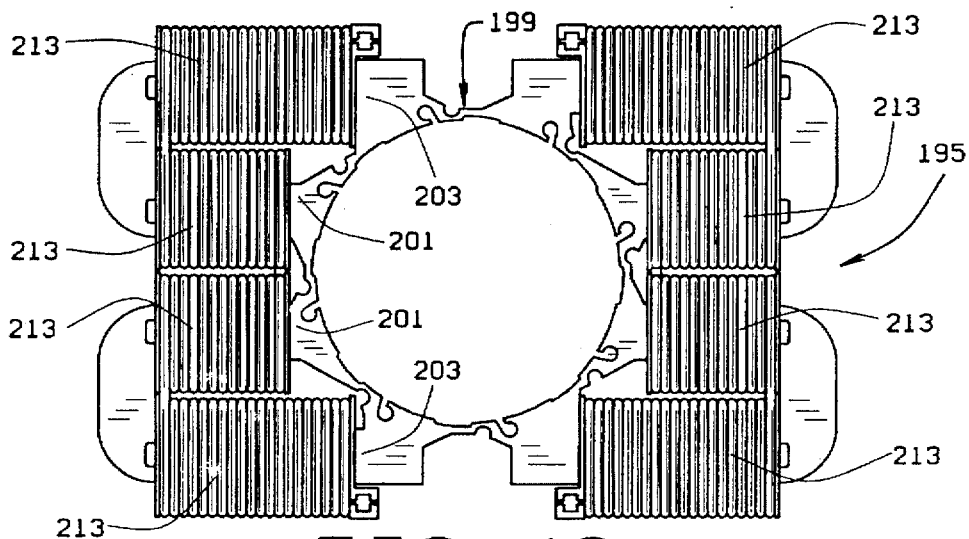
FIG. 48 is a side elevational view of an eight pole shaded pole motor of the type illustrated in FIGS. 29–33 with the bobbin construction illustrated in FIG. 49 mounted about adjacent and spaced side legs on each side of the central portion.
Figure 49:
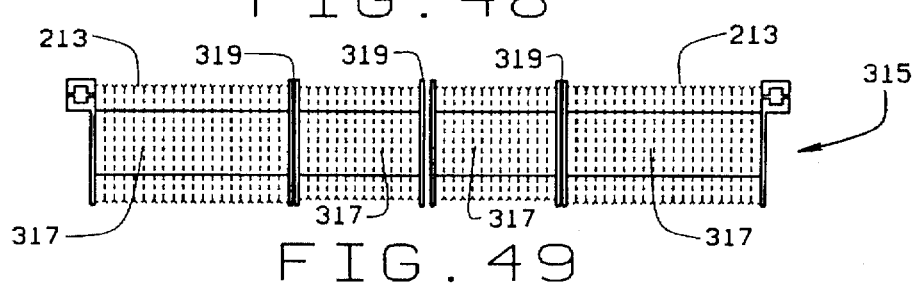
FIG. 49 is a side elevational view of a bobbin construction illustrating a plurality of adjacent and separate bobbin sections for use in the eight pole shaded pole motor shown in FIG. 48.

For use with any one or more of the above motors, a series of bobbins, about which coils can be wound in a continuous fashion, or illustrated in FIGS. 47 and 49 of the drawings for use in the six pole shaded pole motor 125 shown in FIG. 46 and the eight pole shaded pole motor shown in FIG. 48 of the drawings. Specifically, FIG. 46 shows a six pole shaded pole motor 125 similar to FIGS. 17–25 having inner connected bobbins 309 with coils 147 wound about the bobbin sections 309. As illustrated, there are two adjacent bobbin sections 309, 309. Further, between two spaced pairs of bobbin sections 309, 309 and 309, 309, there are separate projections 313 for protecting the wires extending between pairs of bobbin sections 309. With the bobbins 309 as illustrated in FIG. 47 of the drawings, the bobbins can be mounted over a mandrel (not shown) for the continuous winding of the bobbin sections 309 with the coils 147. Thus, when used in the winding of coils 147, the bobbin sections 309 are shown in FIG. 47 of the drawings as being aligned with respect to one another, for the placement over a winding mandrel (not shown) in the continuous automatic winding of adjacent bobbins sections 309 with the coils 147. Following winding, the interconnected bobbin sections 309 can be positioned on the spaced legs 131, as shown in FIG. 46. As will be appreciated, the same winding of the coils 147 and the assembly of the coils 147 over the spaced legs 131 saves in both winding time and material utilized, as compared to individual coil winding and assembly.

In FIG. 48 of the drawings, an eight pole shaded pole motor 195 is shown as having four adjacent bobbin sections 317 interconnected by three living hinges 319. Each of the four bobbin sections 317 are wound sequentially without a break between coils, after alignment and mounting on a suitable mandrel (not shown), in order to provide the four electrically conductive coils 213 for mounting over the four spaced legs 201, 201 and 203, 203 on each side of the eight pole central portion 199, as illustrated in FIG. 48 of the drawings.

As will be appreciated, the interconnected bobbins with or without living hinges can be manufactured with similar or dissimilar bobbin sections, as may be required, as well as with separate projections or compartments for wires or other components, as may be desired.

From the foregoing, it will now be appreciated that the variety of different types and kinds of low cost multi-pole motor constructions, including shaded pole, permanent split capacitor, stepper, switched reluctance and other types of motors, provides economical and efficient constructions not previously available, while using conventional manufacturing operations to produce such motors through the modified techniques that are disclosed. As a result, the low cost multi-pole motor constructions of the present invention can be adapted for use in a variety of different motor applications.

In view of the above, it will be seen that the several objects and advantages of the present invention have been achieved and other advantageous results have been obtained.

As various changes could be made in the above constructions or methods without departing from the scope of the invention, it is intended that all matter contained in the above description or shown in the accompanying drawings shall be interpreted as illustrative and not in a limiting sense.

I claim:

1. A motor comprising:

magnetically conductive stacked laminations each having a one-piece multi-pole central portion with a rotor opening and at least three spaced pairs of adjacent side legs extending outwardly from circumferentially spaced areas of said central portion, each side leg of the spaced pairs of adjacent side legs being connected at one end to one circumferentially spaced area of the central portion and terminating in an outer free extremity at a second end, the combined stacked laminations providing at least three spaced pairs of stacked adjacent side legs in circumferentially spaced areas of stacked central portions with aligned rotor openings for receiving a rotor, the first end of each of said stacked adjacent side legs at its associated circumferentially spaced area around the central portion having a different polarity from the first end of each stacked adjacent side leg in order to provide an alternating polarity of poles around the central portion, the second end of each stacked adjacent side leg having a different polarity than its first end;

each side leg of the stacked adjacent side legs having a combined predetermined outer cross sectional coil winding area;

an electrically conductive coil operably positioned relative to the coil winding area of at least three of the stacked adjacent side legs; and separate magnetically conductive stacked laminations for attachment to the outer free extremities of the stacked adjacent side legs.

2. The motor as defined in claim 1 wherein the stacked adjacent side legs extend from generally opposite areas of said central portion.

3. The motor as defined in claim 2 including an electrically conductive coil positioned about each side leg of at least two stacked pairs of adjacent side legs.

4. The motor as defined in claim 3 including pole shading elements positioned in openings surrounding said rotor opening to form a shaded pole motor.

5. The motor as defined in claim 3 including a rotor having poles circumferentially offset from the multi-pole central portion at predetermined circumferentially spaced positions to form a switched reluctance motor.

6. The motor as defined in claim 2 wherein said motor is a two pole permanent split capacitor motor which includes an electrically conductive first coil positioned about one pair of stacked adjacent side legs on one side of said central portion and electrically conductive second coils are positioned about each side leg of one pair of stacked adjacent side legs on the opposite side of said central portion, said first coil being connected to said second coils and one of said first coil or said second coils being connected to a capacitor to form said motor.

7. The motor as defined in claim 6 wherein the first coil is a main coil and said second coils are auxiliary coils.

8. The motor as defined in claim 6 wherein the first coil is an auxiliary coil and said second coils are main coils.

9. The motor as defined in claim 1 where at least one of the separate magnetically conductive stacked laminations has a U-shape with spaced legs for attachment to at least one pair of stacked adjacent side legs.

10. The motor as defined in claim 1 wherein two of the at least three pair of stacked adjacent side legs extend from generally opposite areas of said central portion.

11. The motor as defined in claim 10 wherein at least one additional pair of stacked adjacent side legs extends from sad central portion generally intermediate said generally opposite areas of said central portion.

12. The motor as defined in claim 10 wherein the at least three pairs of slacked adjacent side legs are generally equidistantly spaced from one another about said central portion.

13. The motor as defined in claim 10 wherein said motor is a four pole permanent split capacitor motor which includes an electrically conductive main coil and an electrically conductive auxiliary coil alternatively positioned about each side leg of two spaced pairs of adjacent stacked side legs on opposite sides of said central portion, each main coil being connected to one another, each auxiliary coil being connected to one another, and the auxiliary coils being connected in series with a capacitor to form said motor.

14. The motor as defined in claim 10 wherein said motor is an eight pole shaded pole motor which includes an electrically conductive coil positioned about each stacked adjacent side leg of two adjacent pairs of stacked adjacent side legs on opposite sides of said central portion, and separate magnetic conductive stacked end laminations for attachment to the outer free extremities of adjacent pairs of stacked adjacent side legs on opposite sides of said central portion.

15. The motor as defined in claim 10 wherein said motor is a four pole stepper motor which includes an electrically conductive coil positioned about each side leg of a plurality stacked adjacent side legs on opposite sides of an eight pole central portion, separate magnetic conductive stacked end laminations for attachment to the outer free extremities of the plurality of adjacent pairs of stacked adjacent side legs on opposite sides of said central portion, the aligned rotor openings having a circumferential series of aligned inwardly directed teeth which cooperate with a permanent magnet rotor having outwardly directed teeth offset by one tooth on opposite ends of the rotor, and four alternate coils of the eight coils on opposite sides of the central portion being connected to one phase of a two phase power source and the other alternate four coils being connected to the other phase of the two phase power source.

16. The motor as defined in claim 1 wherein said motor is a six pole motor which includes an electrically conductive coil positioned about each side leg of three pairs of stacked adjacent side legs circumferentially spaced around said central portion.

17. The motor as defined in claim 16 wherein said six pole motor is a six pole shaded pole motor.

18. The motor as defined in claim 16 wherein said six pole motor is a six pole switched reluctance motor including a six pole central portion and a five pole rotor.

19. The motor as defined in claim 1 wherein said motor is a six pole motor which includes an electrically conductive coil positioned about at least one side leg in each pair of the three pairs of stacked adjacent side legs circumferentially spaced around said central portion.

20. The motor as defined in claim 1 wherein said motor is a six pole motor having three circumferentially spaced pairs of stacked adjacent side legs and an electrically conductive coil is positioned about the separate magnetically conductive stacked laminations that are attached to the outer free extremities of each stacked adjacent side leg in each pair of stacked adjacent side legs.

21. The motor as defined in claim 1 wherein said motor is a six pole permanent split capacitor motor which includes an electrically conductive coil positioned about each side leg of four stacked adjacent side legs in each of three circumferentially spaced groups off our stacked spaced side legs, said coils being connected to one another as main coils and auxiliary coils and a capacitor being connected to said auxiliary coils to form said motor.

22. A two pole permanent split capacitor motor comprising:

magnetically conductive stacked laminations each having a two pole central portion with a rotor opening for receiving a rotor and two spaced pairs of stacked adjacent side legs on one side of said central portion and one spaced pair of stacked adjacent side legs on the other side of said central portion;

an electrically conductive first coil positioned about one spaced pair of the two spaced pairs of stacked adjacent side legs on one side of said central portion;

an electrically conductive second coil positioned about each of the stacked adjacent side, legs of said spaced pair of side legs on the other side of said central portion;

the first and second electrically conductive coils being connected to the two pole central portion to provide two sets of alternating polarity poles extending around the two pole central portion:

said first coil being connected to each of said second coils and one of said first coil or said second coils being connected to a capacitor; and separate magnetically conductive stacked end laminations for attachment to an other free extremity of each spaced pair of side legs on both sides of said central portion.

23. The two pole permanent split capacitor motor as defined in claim 22 wherein the one spaced pair of stacked adjacent side legs on one side of said two pole central portion are each approximately twice the width of individual side legs forming the two spaced pairs of stacked adjacent side legs on the other side of said two pole central portion.

24. The two pole permanent split capacitor motor as defined in claim 22 wherein the first coil has generally the same amount of coil windings as the two second coils.

25. The two pole permanent split capacitor motor as defined in claim 22 wherein the two outermost spaced stacked adjacent side legs are both spaced from said two innermost spaced stacked adjacent side legs as well as being spaced from one pole of the two pole central portion.

26. The two pole permanent split capacitor motor as defined in claim 22 wherein the first coil is a main coil and said second coils are auxiliary coils.

27. The two pole permanent split capacitor motor as defined in claim 22 wherein the first coil is an auxiliary coil and said second coils are main coils.

28. A four pole permanent split capacitor motor comprising:
- magnetically conductive stacked laminations each having a four pole central portion with a rotor opening for receiving a rotor and two spaced pairs of stacked adjacent side legs on each side of said central portion;
- an electrically conductive main coil positioned about one stacked adjacent side leg and an electrically conductive auxiliary coil positioned about said other stacked adjacent side leg in each pair of smoked adjacent side legs of the two spaced pairs of stacked adjacent side legs on each side of said central portion;
- the main and auxiliary coils being connected to the four pole central portion to provide two sets of alternating polarity poles extending around the four pole central portion;
- each main coil in each pair of stacked adjacent side legs being connected to one another and each auxiliary coil in each pair of stacked adjacent side legs being connected to one another and to a capacitor; and
- separate magnetically conductive stacked end laminations for attachment to an outer free extremity of said two spaced pairs of stacked adjacent side legs on each side of said central portion.

29. The four pole permanent split capacitor motor as defined in claim 28 wherein each end lamination has a double U-shape with four spaced legs for attachment to the two spaced pairs of stacked adjacent side legs on each side of the central portion.

30. The four pole permanent split capacitor motor as defined in claim 28 wherein the two spaced pairs of stacked adjacent side legs on opposite sides of said four pole central portion extend from generally equal circumferentially spaced areas around the four pole central portion.

31. The four pole permanent split capacitor motor as defined in claim 28 wherein the two spaced pairs of stacked adjacent side legs on each side of said four pole central portion include two innermost side legs and two outermost side legs, the two innermost side legs extending generally laterally away from the four pole central portion in parallel relationship to one another while the two outermost legs extend first generally transverse to said innermost legs and then extend in generally parallel relationship to said innermost legs.

32. The four pole permanent split capacitor motor as defined in claim 28 where in the two outermost legs receive electrically conductive coils of different length and different mount of coil windings than the two innermost legs.

33. A six pole permanent spat capacitor motor comprising:
- magnetically conductive stacked side laminations each having a six pole central portion with a rotor opening for receiving a rotor and three circumferentially spaced pairs of stacked adjacent side legs;
- an electrically conductive coil positioned about each stacked adjacent side leg of said three circumferentially spaced pair of stacked adjacent side legs;
- the coils being connected to the six pole central portion to provide two sets of alternating polarity poles extending about the six pole central portion:
- said electrically conductive coils being connected to one another as main coils and auxiliary coils with said auxiliary coils being connected to a capacitor; and
- separate magnetically conductive stacked end laminations for attachment to an outer free end of each pair of smoked adjacent side legs.

34. The six pole permanent split capacitor motor as defined in claim 33 wherein the main coils and auxiliary coils are positioned in alternating fashion around the stacked adjacent side legs in each pair of stacked adjacent side legs of said three circumferentially spaced pairs of stacked adjacent side legs, said main coils and auxiliary coils being connected to one another and each auxiliary coil being connected to one another and a capacitor to form said motor.

35. The six pole permanent split capacitor motor as defined in claim 34 wherein there are four stacked adjacent side legs forming three circumferentially spaced groups of four stacked spaced side legs.

36. A multi-pole switched reluctance motor comprising:
- magnetically conductive stacked laminations each having a multi-polo central portion with a rotor opening for receiving a rotor and one pair of spaced side legs;
- said rotor having poles circumferentially offset from the poles of said multi-pole central portion at predetermined circumferentially spaced positions;
- an electrically conductive coil positioned about each of the spaced and adjacent side legs of said spaced pair of side legs;
- each coil being electrically connected to provide an alternating plurality of poles extending around the multi-pole central portion; and
- separate magnetically conductive stacked end laminations for attachment to an outer free end of said pair of spaced side legs.

37. A two polo switched reluctance motor comprising:
- magnetically conductive stacked laminations each having a two pole central portion with a rotor opening for receiving a rotor and one pair of spaced side legs;
- said rotor having poles circumferentially offset from the poles of said two pole central portion at predetermined circumferentially spaced positions;
- an electrically conductive coil positioned about each of the spaced and adjacent side legs of said spaced pair of side legs;
- each coil being electrically connected to provide an alternating plurality of poles extending around the two pole central portion; and
- separate magnetically conductive stacked end laminations for attachment to an outer free end of said pair of spaced side legs.

38. A four pole switched reluctance motor comprising:
- magnetically conductive stacked laminations each having a four pole central portion with a rotor opening for receiving a rotor and one pair of spaced side legs;
- said rotor having poles circumferentially offset from the poles of said four pole central portion at predetermined circumferentially spaced positions;
- an electrically conductive coil positioned about each of the spaced and adjacent side legs of said spaced pair of side legs;
- each coil being electrically connected to provide an alternating plurality of poles extending around the four pole central portion; and
- separate magnetically conductive stacked end laminations for attachment to an outer free end of said pair of spaced side legs.

39. A six pole motor comprising:
- magnetically conductive stacked side laminations each having a six pole central portion with a rotor opening for receiving a rotor and three outwardly extending circumferentially spaced pairs of stacked adjacent side legs with each stacked adjacent side leg terminating in an outer free end;

an electrically conductive coil positioned about each of the stacked adjacent side legs of said three circumferentially spaced pairs of side legs; and separate magnetically conductive stacked end laminations for attachment to an outer free end of each pair of stacked adjacent side legs.

40. The six pole motor as defined in claim 39 wherein two spaced pairs of side legs are arranged in mirror image relationship to one another while the third pair of spaced side legs extends generally transverse to the other two spaced pairs of side legs.

41. The six pole motor as defined in claim 39 wherein pole shading elements are positioned in openings surrounding said rotor opening and in proximity to the poles of said six pole central portion to form a six pole shaded pole motor.

42. The six pole motor as defined in claim 39 wherein said six pole motor is a switched reluctance motor.

43. The six pole motor as defined in claim 39 where the end laminations have a U-shape with spaced legs for attachment to the outer free end of each pair of stacked adjacent side legs.

44. An eight pole motor comprising:

magnetically conductive stacked laminations each having an eight pole central portion with a rotor opening for receiving a rotor and two spaced pairs of stacked adjacent side legs extending outwardly on each side of said central portion;

an electrically conductive coil positioned about each of the stacked adjacent side legs of said two spaced pairs of stacked adjacent side legs on each side of said central portion, each electrical coil being electrically connected to provide an alternating polarity of poles extending around the eight pole central portion;

separate magnetically conductive stacked end laminations for attachment to outer free extremities of each pair of said adjacent pairs of stacked adjacent side legs on opposite sides of said central portion.

45. The eight pole motor as defined in claim 44 wherein the two spaced pairs of stacked adjacent side legs on opposite sides of said four pole central portion are in mirror image relationship to one another.

46. The eight pole motor as defined in claim 44 wherein the two spaced pairs of stacked adjacent side legs on opposite sides of said four pole central portion extend from generally equal circumferentially spaced areas around the four pole central portion.

47. The eight pole motor as defined in claim 46 wherein the two spaced pairs of stacked adjacent side legs on each side of said four pole central portion include two innermost side legs and two outermost side legs, the two innermost side legs extending generally laterally away from the four pole central portion in parallel relationship to one another while the two outermost legs extend first generally transverse to said innermost legs and then extend in generally parallel relationship to said innermost legs.

48. The eight pole motor as defined in claim 44 wherein the two outermost legs receive electrically conductive coils of greater length and greater coil windings than the two innermost legs.

49. A stepper motor comprising:

magnetically conductive stacked laminations each having a multi-pole central portion with a rotor opening for receiving a rotor and two spaced pairs of stacked adjacent side legs on each side of said central portion;

two sets of alternating polarity poles extending around the multi-pole central portion;

an electrically conductive coil positioned about each of the stacked adjacent side legs of said two spaced pairs of stacked adjacent side legs on each side of said multi-pole central portion;

separate magnetically conductive stacked end laminations for attachment to outer free extremities of each pair of said adjacent pairs of stacked adjacent side legs on opposite sides of said central portion;

a circumferential series of inwardly directed teeth around each rotor opening for cooperation with a permanent magnet rotor having outwardly directed teeth offset by one on opposite ends; and four alternate coils on opposite sides of the eight pole central portion being connected to the one phase of a two phase power source and the other alternate four coils being connected to the other phase of the two phase power source.

50. A six pole motor comprising:

magnetically conductive stacked laminations each having a six pole central portion with rotor opening for receiving a rotor and three outwardly extending circumferentially spaced pairs of spaced and stacked adjacent side legs with each stacked adjacent side leg terminating in an outer free end;

an electrically conductive coil positioned about each of the stacked adjacent side legs of said three circumferentially spaced pairs of side legs; each electrical coil being electrically connected to provide an alternating polarity of poles extending around the six pole central portion; and separate magnetically conductive stacked U-shaped laminations with spaced legs for attachment to the outer free end of each pair of stacked adjacent side legs.

51. The six pole motor as defined in claim 50 in which the spaced legs of the U-shaped laminations have a length greater than the length of the stacked adjacent side legs extending from the six pole central portion.

52. The six pole motor as defined in claim 50 in which the circumferentially spaced pairs of stacked adjacent side legs are generally equidistantly spaced from one another.

53. The six pole motor as defined in claim 50 in which pole shading elements are positioned in openings surrounding the rotor opening in proximity to the poles of the six pole central portion to form a six pole shaded pole motor.

54. A six pole motor comprising:

magnetically conductive stacked laminations each having a six pole central portion with rotor opening for receiving a rotor and three outwardly extending spaced pairs of stacked adjacent side legs with each stacked adjacent side leg terminating in an outer free end, the three spaced pairs of stacked adjacent side legs being generally equidistantly spaced from one another;

an electrically conductive coil positioned about each of the stacked adjacent side legs of said three circumferentially spaced pairs of stacked adjacent side legs; each electrical coil being electrically connected to provide an alternating polarity of poles extending around the six central portion; and separate magnetically conductive stacked U-shaped laminations with spaced legs for attachment to the outer free end of each pair of stacked adjacent side legs.

55. A six pole motor comprising:

magnetically conductive stacked side laminations each having a six pole central portion with a rotor opening for receiving a rotor and three outwardly extending circumferentially spaced pairs of spaced and stacked adjacent side legs;

each side leg of the stacked adjacent side leg being connected at a first end to the six pole central position and terminating in an outer free end at a second end, the first end of each stacked adjacent side leg having a different polarity than an adjacent stacked side leg to provide an alternating polarity of poles around the six pole central portion, the second end of each stacked adjacent side leg having a different polarity than its first end;

an electrically conductive coil positioned about each of the stacked adjacent side legs of said three circumferentially spaced pairs of stacked adjacent side legs;

separate magnetically conductive stacked U-shaped end laminations with spaced legs for attachment to the outer free end of each pair of stacked adjacent side legs; and each of the electrically conductive coils being connected in series with one another.

* * * * *

UNITED STATES PATENT AND TRADEMARK OFFICE
CERTIFICATE OF CORRECTION

PATENT NO. : 5,729,071
DATED : March 17, 1998
INVENTOR(S) : Robert E. Steiner

It is certified that error appears in the above-identified patent and that said Letters Patent is hereby corrected as shown below:

Column 2, Line 6, delete "an&or", insert -and/or;
Column 3, Line 39, delete "C-flame", insert -C-frame-;
Column 11, Line 51, delete "ram", insert -turn-;
Column 16, Lines 3 and 4, Replace sentences begining on lines 3 and 4 as follows: --Then, it can be seen that the two upper main windings are displaced 45 mechanical or 90 electrical degrees in space from the two upper auxiliary windings. The same is true for the lower half of the stator.--
Column 29, Line 47-48, after "plurality", insert -of adjacent pairs of -;
Column 30, Line 19, delete "off our", insert -of four-;
Column 30, Line 46, delete "other", insert -outer-;
Column 31, Line 49, delete "spat", insert -split-;
Column 31, Line 67, delete "smoked", insert -stacked-;
Column 32, Line 15, delete "multi-polo", insert -multi-pole-; and
Column 34, Lines 60-61, after "six", insert -pole-.

Signed and Sealed this

Ninth Day of June, 1998

Attest:

BRUCE LEHMAN

Attesting Officer

Commissioner of Patents and Trademarks